(12) United States Patent
Pushparaj et al.

(10) Patent No.: US 8,603,195 B2
(45) Date of Patent: Dec. 10, 2013

(54) 3D APPROACH ON BATTERY AND SUPERCAPITOR FABRICATION BY INITIATION CHEMICAL VAPOR DEPOSITION TECHNIQUES

(75) Inventors: Victor L. Pushparaj, Sunnyvale, CA (US); Pravin K. Narwankar, Sunnyvale, CA (US); Omkaram Nalamasu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 396 days.

(21) Appl. No.: 12/858,531

(22) Filed: Aug. 18, 2010

(65) Prior Publication Data

US 2011/0045349 A1 Feb. 24, 2011

Related U.S. Application Data

(60) Provisional application No. 61/236,454, filed on Aug. 24, 2009.

(51) Int. Cl.
| | |
|---|---|
| *H01M 4/13* | (2010.01) |
| *H01M 4/58* | (2010.01) |
| *H01M 4/60* | (2006.01) |
| *H01M 4/82* | (2006.01) |
| *H01M 6/12* | (2006.01) |
| *H01M 6/46* | (2006.01) |
| *B05D 5/12* | (2006.01) |

(52) U.S. Cl.
USPC ....... 29/623.5; 429/162; 429/212; 429/218.1; 429/231.1; 427/80; 427/81; 977/742; 977/891; 977/948

(58) Field of Classification Search
USPC ........... 429/212, 162, 218.1, 231.1; 29/623.5; 427/80, 81; 977/742, 891, 948
See application file for complete search history.

(56) References Cited

U.S. PATENT DOCUMENTS 6,402,796 B1 * 6/2002 Johnson ...................... 29/623.5
7,431,969 B2 10/2008 Gleason et al.
(Continued)

FOREIGN PATENT DOCUMENTS

EP 0693792 1/1996

OTHER PUBLICATIONS

International Search Report and Written Opinion of the International Searching Authority mailed Apr. 27, 2011 in PCT/US2010/046069.
(Continued)

*Primary Examiner* — Sean P Cullen
(74) *Attorney, Agent, or Firm* — Patterson & Sheridan, LLP

(57) ABSTRACT

Methods and apparatus for forming energy storage devices are provided. In one embodiment a method of producing an energy storage device is provided. The method comprises positioning an anodic current collector into a processing region, depositing one or more three-dimensional electrodes separated by a finite distance on a surface of the anodic current collector such that portions of the surface of the anodic current collector remain exposed, depositing a conformal polymeric layer over the anodic current collector and the one or more three-dimensional electrodes using iCVD techniques comprising flowing a gaseous monomer into the processing region, flowing a gaseous initiator into the processing region through a heated filament to form a reactive gas mixture of the gaseous monomer and the gaseous initiator, wherein the heated filament is heated to a temperature between about 300° C. and about 600° C., and depositing a conformal layer of cathodic material over the conformal polymeric layer.

11 Claims, 17 Drawing Sheets

(56) References Cited

U.S. PATENT DOCUMENTS

| | | |
|---|---|---|
| 7,579,112 B2* | 8/2009 | Chiang et al. ................ 429/209 |
| 2002/0064710 A1 | 5/2002 | Kawakami et al. |
| 2004/0053124 A1* | 3/2004 | LaFollette et al. ............ 429/149 |
| 2004/0175621 A1 | 9/2004 | Iriyama et al. |
| 2007/0032620 A1 | 2/2007 | Gleason et al. |
| 2010/0248443 A1* | 9/2010 | Lee et al. ...................... 438/422 |
| 2010/0255303 A1* | 10/2010 | Wardle et al. ................ 428/378 |

OTHER PUBLICATIONS

Wyatt E. Tenhaeff, et al.; Initiated and Oxidative Chemical Vapor Deposition of Polymeric Thin Films: iCVD and oCVD; Adv. Funct. Mater. 2008, 18, pp. 979-992.

* cited by examiner

3D APPROACH ON BATTERY AND SUPERCAPITOR FABRICATION BY INITIATION CHEMICAL VAPOR DEPOSITION TECHNIQUES

CROSS-REFERENCE TO RELATED APPLICATIONS

This application claims benefit of U.S. provisional patent application Ser. No. 61/236,454, filed Aug. 24, 2009, which is herein incorporated by reference in its entirety.

BACKGROUND OF THE INVENTION

1. Field of the Invention

Embodiments of the present invention generally relate to the formation of an energy storage device. More particularly, embodiments described herein relate to an apparatus and methods used to form electric batteries and electrochemical capacitors.

2. Description of the Related Art

Fast-charging, high-capacity energy storage devices, such as supercapacitors and lithium (Li+) ion batteries, are used in a growing number of applications, including portable electronics, medical, transportation, grid-connected large energy storage, renewable energy storage, and uninterruptible power supply (UPS) applications. In each of these applications, the charge time and capacity of energy storage devices are important parameters. In addition, the size, weight, and/or expense of such energy storage devices can be significant limitations. Further, low internal resistance is necessary for high performance. The lower the resistance, the less restriction the energy storage device encounters in delivering electrical energy. For example, in the case of super capacitors, lower internal resistance allows faster and more efficient charging and discharging thereof. In the case of a battery, internal resistance in a battery impacts performance by reducing the total amount of useful energy stored by the battery as well as the ability of the battery to deliver the high current pulses demanded by digital devices.

Accordingly, there is a need in the art for faster charging, higher capacity energy storage devices that are smaller, lighter, and can be more cost effectively manufactured. There is also a need in the art for components for an electrical storage device that reduce the internal resistance of the storage device.

SUMMARY

Embodiments of the present invention generally relate to the formation of an energy storage device. More particularly, embodiments described herein relate to an apparatus and methods used to form electric batteries and electrochemical capacitors. In one embodiment a method of producing an energy storage device is provided. The method comprises positioning an anodic current collector into a processing region, depositing one or more three-dimensional electrodes separated by a finite distance on a surface of the anodic current collector such that portions of the surface of the anodic current collector remain exposed, depositing a conformal polymeric layer over the anodic current collector and the one or more three-dimensional electrodes using iCVD techniques comprising flowing a gaseous monomer into the processing region, flowing a gaseous initiator into the processing region through a heated filament to form a reactive gas mixture of the gaseous monomer and the gaseous initiator, wherein the heated filament is heated to a temperature between about 300° C. and about 600° C., depositing a conformal layer of cathodic material over the conformal polymeric layer, and depositing a cathodic current collector over the conformal layer of cathodic material.

In another embodiment, an energy storage device is provided. The energy storage device comprises an anodic current collector substrate, one or more three-dimensional anode electrodes separated by a finite distance formed on a surface of the anodic current collector substrate such that portions of the surface of the anodic current collector remain exposed, an insulator layer disposed on the exposed portions of the surface of the anodic current collector between the one or more three-dimensional electrodes, a conformal electrolytic polymeric layer formed over the one or more three-dimensional electrodes and the insulator layer, a conformal layer of cathodic material formed over the electrolytic polymeric layer, and a cathodic current collector formed over the conformal layer of cathodic material.

In yet another embodiment, an apparatus for forming an energy storage device is provided. The apparatus comprises a first end, a second end, at least one continuous web of conductive material extending from the first end to the second end, a support system to support the at least one web of conductive material from the first end to the second end, a first chamber disposed between the first end and the second end, wherein the first chamber comprises a target having a surface in contact with a processing region, wherein the target comprises a catalytic material, and a power supply adapted to deliver energy to the target so that atoms from the surface of the target are deposited on a surface of a substrate disposed in the processing region, a second chamber disposed between the first end and the second end, wherein the second chamber comprises a hot filament adapted to be heated at a surface temperature higher than 1,500° C., a showerhead that is adapted to deliver a carbon source gas to form carbon nanotubes on the substrate using a hot wire chemical vapor deposition (HWCVD) process, and a carbon source gas coupled with the showerhead, and a third chamber disposed between the first end and the second end, wherein the third chamber comprises a first source configured to deliver an initiator source gas, a second source configured to deliver a monomer source gas, and a filament adapted to be heated at a temperature between about 300° C. and 450° C. configured and adapted to deposit a non-conductive polymer over the substrate using an initiated chemical vapor deposition (iCVD) process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
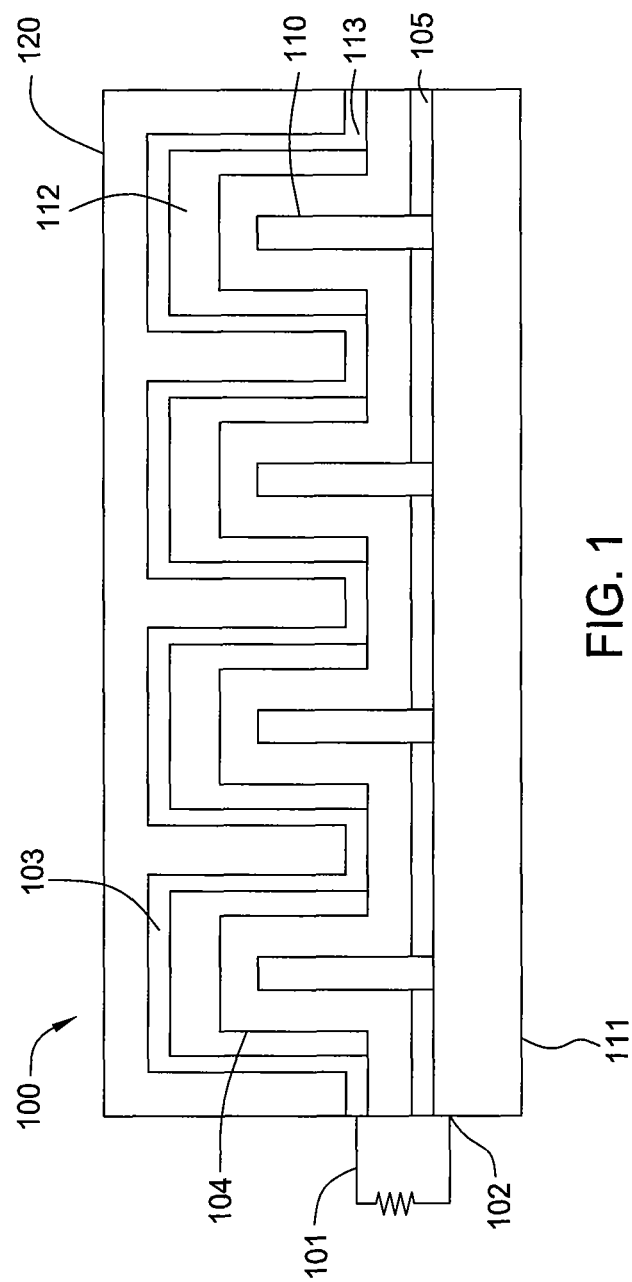
FIG. 1 is a schematic diagram of one embodiment of a Li-ion battery electrically connected to a load.

Embodiments of the present invention provide cost effective methods for the formation of energy storage devices, such as batteries and supercapicitors, using initiation chemical vapor deposition (iCVD) techniques. Certain embodiments described herein include the formation of a conformal electrolytic polymer layer over a carbon nanotube structure using iCVD techniques.

In one embodiment, aligned nanowires or nanotubes are deposited on a first current collector comprising aluminum, copper, or any other conducting metals. The individual nanowires or nanotubes may be separated by a finite distance which can be varied from 5 nm to 500 nm, while in other embodiments the separation between the bundles of nanowires or nanotubes are from 10 um to 500 um. A thin oxide layer (4 nm to 100 nm) or a non-conducting polymer layer may be deposited to surround either the individual nanowires/nanotubes or the bundles of nanowires/nanotubes. This selective deposition may be carried out using masking techniques. Next, initiated-CVD (iCVD) techniques may be used to deposit electrolytic polymers comprising highly conducting ions along the nanowires or nanotubes. The iCVD deposition process produces a conformal coating hence the polymeric coating is observed along the nanowires or nanotubes or bundles of the nanowires/nanotubes. In one embodiment, the electrolytic polymer may be replaced by a highly non-conducting porous polymer filled with electrolytes such as a room temperature ionic liquid (RTIL). The non-conducting porous polymer may also be deposited using iCVD techniques. Once the electrolytic polymer or electrolyte containing polymer is deposited cathodic materials (e.g., Li-ion containing polymer) may also be deposited by iCVD technique to take up the conformality of the previously deposited structure. A second current collector may be deposited on top of the cathodic materials. In one embodiment, the second current collector may be formed throughout the substrate/wafer with the leads taken at either end of the substrate/wafer. In one embodiment, the leads may be taken along either the bundles of nanotubes/nanowires or the individual nanotubes/nanowires. A non-reactive polymer may be deposited on top of the current collectors in order to avoid the reactivity of the cathodic surface with the atmosphere. The non-reactive polymer may be deposited using iCVD techniques. In one embodiment, the entire device may be packaged by a non-conductive polymer deposited using iCVD techniques. This leads to a simple and cost-effective formation of a three-dimensional battery structures using iCVD techniques. In one embodiment, the cathode may be replaced by carbonaceous electrodes like activated carbon or porous carbon resulting in the formation of a three-dimensional supercapacitor using iCVD techniques.

While the particular apparatus in which the embodiments described herein can be practiced is not limited, it is particularly beneficial to practice the embodiments in a cluster tool system or a web-based roll-to-roll system sold by Applied Materials, Inc., Santa Clara, Calif. Exemplary roll-to-roll, linear systems, and cluster tool systems on which the embodiments described herein may be practiced are described in further detail in commonly assigned U.S. Provisional Patent Application Ser. No. 61/243,813, filed Sep. 18, 2009, titled APPARATUS AND METHODS FOR FORMING ENERGY STORAGE OR PV DEVICES IN A LINEAR SYSTEM, which is herein incorporated by reference in its entirety.

FIG. 1 is a schematic diagram of one embodiment of a Li-ion battery 100 electrically connected to a load 101, according to one embodiment described herein. The primary functional components of the Li-ion battery 100 include an anode structure 102, a cathode structure 103, a separator layer 104, and an electrolyte (not shown) disposed within the region between the opposing current collectors 111 and 113. A variety of materials may be used as the electrolyte, such as a lithium salt in an organic solvent. The electrolyte is contained in the anode structure 102, the cathode structure 103, and a fluid-permeable separator layer 104 in the region formed between the current collectors 111 and 113.

The anode structure 102 and the cathode structure 103 each serve as a half-cell of the Li-ion battery 100 and together form a complete working cell of the Li-ion battery 100. The anode structure 102 includes a current collector 111 and an anode electrode 110 that acts as a carbon-based intercalation host material for retaining lithium ions. Similarly, the cathode structure 103 includes a current collector 113 and an intercalation host material 112 for retaining lithium ions, such as a metal oxide. In one embodiment, the separator layer 104 is an electrolytic polymeric, fluid-permeable layer that prevents direct electrical contact between the components in the anode structure 102 and the cathode structure 103. Methods of forming the Li-ion battery 100, as well as the materials that make up the constituent parts of the Li-ion battery 100, i.e., the anode structure 102, the cathode structure 103, and the separator layer 104, are described below in conjunction with FIGS. 2A-2F.

Rather than the traditional redox galvanic action of a conventional secondary cell, Li-ion secondary cell chemistry depends on a fully reversible intercalation mechanism, in which lithium ions are inserted into the crystalline lattice of an intercalation host material in each electrode without changing the crystal structure of the intercalation host material. Thus, it is necessary for such intercalation host materials in the electrodes of a Li-ion battery to have open crystal structures that allow the insertion or extraction of lithium ions and have the ability to accept compensating electrons at the same time. In Li-ion battery 100, the anode, or negative electrode, is based on carbon, i.e., a carbon nanotube structure. The cathode, or positive electrode, is made from a metal oxide, such as lithium cobalt dioxide ($LiCoO_2$) or lithium manganese dioxide ($LiMnO_2$). The cathode structure 103 may be made from a layered oxide, such as lithium cobalt oxide, a polyanion, such as lithium iron phosphate, a spinel, such as lithium manganese oxide, or $TiS_2$ (titanium disulfide). Exemplary oxides may be layered lithium cobalt oxide, or mixed metal oxide, such as $LiNi_xCo_{1-2x}MnO_2$, $LiMn_2O_4$. Exemplary phosphates may be iron olivine ($LiFePO_4$) and it is variants (such as $LiFe_{1-x}MgPO_4$), $LiMoPO_4$, $LiCoPO4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, or $Na_5V_2(PO_4)_2F_3$. Exemplary silicates may be $Li_2FeSiO_4$, $Li_2MnSiO_4$, or $Li_2VOSiO_4$.

The separator layer 104 is configured to supply ion channels for movement between the anode structure 102 from the cathode structure 103 while keeping the anode structure 102 physically separated from the cathode structure 103 to avoid a short. In one embodiment, the separator layer 104 may be an electrolytic polymer formed according to embodiments described herein.

In operation, the Li-ion battery 100 provides electrical energy, i.e., energy is discharged, when the anode structure 102 and the cathode structure 103 are electrically coupled to the load 101, as shown in FIG. 1. Electrons originating from the anode electrode 110 flow from the current collector 111 of the anode structure 102 through the load 101 and the current collector 113 to the intercalation host material 112 of the cathode structure 103. Concurrently, lithium ions are dissociated, or extracted, from the anode electrode 110 of the anode structure 102, and move through the separator layer 104 into the intercalation host material 112 of the cathode structure 103 and are inserted into the crystal structure of the intercalation host material 112. The electrolyte, which resides in the anode electrode 110, the intercalation host material 112, and the separator layer 104, allows the movement of lithium ions from the anode electrode 110 to intercalation host material 112 via ionic conduction. The Li-ion battery 100 is charged by electrically coupling an electromotive force of an appropriate polarity to the anode structure 102 and the cathode structure 103 in lieu of the load 101. Electrons then flow from the current collector 113 of the cathode structure 103 to the current collector 111 of the anode structure 102, and lithium ions move from the intercalation host material 112 in the cathode structure 103, through the separator layer 104, and into the anode electrode 110 of the anode structure 102. Thus, lithium ions are intercalated into the cathode structure 103 when the Li-ion battery 100 is discharged, and into the anode structure 102 when the Li-ion battery 100 is in the charged state.

Figure 2A:
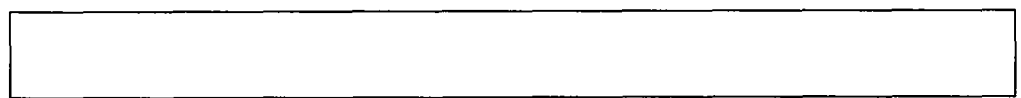
FIGS. 2A-2F are schematic cross-sectional views of one embodiment of an energy storage device formed in accordance with embodiments described herein.

FIGS. 2A-2F are schematic cross-sectional views of one embodiment of the lithium ion battery 100 at various stages of formation according to embodiments described herein. In FIG. 2A, the current collector 111 is schematically illustrated prior to the formation of the anode electrode 110. The current collector 111 may include a relatively thin conductive layer disposed on a host substrate, or simply a conductive substrate (e.g., foil, sheet, plate), comprising one or more conductive materials, such as a metal, plastic, graphite, polymers, carbon-containing polymer, composites, or other suitable materials. In one embodiment, the anodic current collector 111 has a thickness ranging between about 2 microns to about 10 microns. In one embodiment, the anodic current collector 111 has a thickness of about 3 microns to about 5 microns. In another embodiment, the anodic current collector 111 has a thickness of about 3 microns Examples of metals that the current collector 111 may be comprised of include copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, the current collector 111 is a metallic foil and may have an insulating coating disposed thereon. Alternatively, the current collector 111 may comprise a host substrate that is non-conductive, such as a glass, silicon, plastic or polymeric substrate that has an electrically conductive layer formed thereon by means known in the art, including physical vapor deposition (PVD), electrochemical plating, electroless plating, and the like. In one embodiment, the current collector 111 is formed out of a flexible host substrate. The flexible host substrate may be a lightweight and inexpensive plastic material, such as polyethylene, polypropylene or other suitable plastic or polymeric material, with a conductive layer formed thereon. Materials suitable for use as such a flexible substrate include a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). Alternately, the flexible substrate may be constructed from a relatively thin glass that is reinforced with a polymeric coating.

Figure 2B:
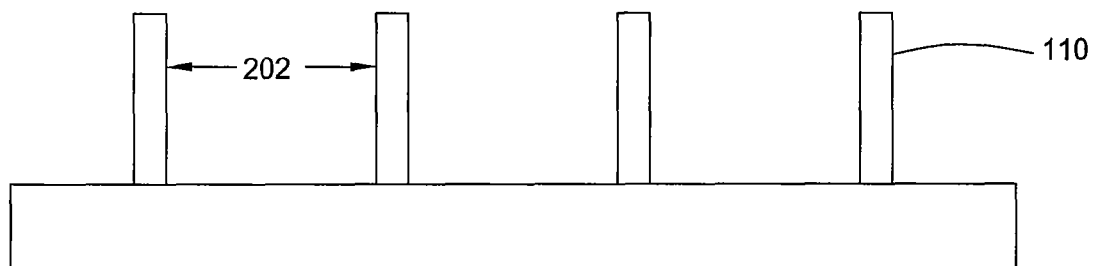

In FIG. 2B, the anode electrode 110 is formed over the current collector 111. The anode electrode 110 may comprise carbon based structures such as carbon nanotubes (CNT), carbon nanofibers, or a carbonaceous structure such as activated carbon or porous carbon may be used. The anode electrode 110 may also include other structures capable of storing lithium including silicon nanowires. Carbon nanotubes and nanofibers are graphitic nanofilaments with diameters ranging from about 0.4 nanometers to about 500 nanometers and lengths which typically range from a few micrometers to a few millimeters. Graphitic nanofilaments may be categorized according to at least four distinct structural types, namely, tubular, herringbone, platelet, and ribbon. The term "nanotube" may be used to describe the tubular structure whereas "nanofiber" may describe the non-tubular forms. Silicon nanowires are generally solid and have diameters ranging from about 20 nanometers to about 50 nanometers.

In one embodiment, the individual carbon based structures or silicon nanowires are separated by a distance 202 from between about 5 nm and about 500 nm. In another embodiment, the carbon based structures are separated by a distance between about 50 nm and about 300 nm. In yet another embodiment, the carbon nanotubes or silicon nanowires are separated by a distance between about 100 nm and about 200 nm. In one embodiment the carbon based structures comprise bundles of carbon nanotubes. In one embodiment, the bundles of carbon nanotubes are separated by a distance from between about 10 μm and about 500 μm. In another embodiment, the bundles of carbon nanotubes are separated by a distance between about 50 μm and about 300 μm. In yet another embodiment, the bundles of carbon nanotubes are separated by a distance from between about 100 μm and about 200 μm.

The carbon nanotubes may be formed using thermal CVD techniques, Plasma Enhanced Chemical Vapor Deposition (PECVD) techniques, or hot-wire chemical vapor deposition (HWCVD).

One desirable processing technique that can be used to form the metalized graphitic nanofilaments is a chemical vapor deposition process (CVD). The chemical vapor deposition (CVD) techniques used to form graphitic nanofilaments may be generally categorized into two types: catalytic and non-catalytic. The methods which use catalyst materials to facilitate and help control the growth of graphitic nanofilaments are referred to as catalytic CVD methods. In one embodiment, the composite material containing metalized graphitic nanofilaments may be formed using catalytic CVD methods such as hot-wire chemical vapor deposition (HWCVD) also known as hot filament CVD (HFCVD). HWCVD uses a hot filament to chemically decompose source gases. The methods which use no catalyst materials for graphitic nanofilament growth are referred to as non-catalytic or pyrolytic CVD methods since only heating, and not catalysis, typically drives nanofilament growth. The catalytic CVD methods often provide greater control over graphitic nanofilament growth than non-catalytic methods.

The CVD growth of carbon nanotubes involves heating catalyst particles to a high temperature and flowing a carbon source gas, such as a hydrocarbon "$C_xH_y$", carbon monoxide, or other carbon-containing gas over the catalyst particles for a period of time. The catalyst particles reside on a surface of the substrate where a conductive substrate is used or on the surface of the current collector. The catalyst particles are typically nanometer scale in size, and the diameters or widths of the graphitic nanofilaments are often closely related to the sizes of the catalyst particles. The catalyst may be deposited on the surface of the substrate or the current collector using wet or dry deposition. Dry deposition techniques include but are not limited to sputtering, thermal evaporation, and chemical vapor deposition (CVD), wet deposition techniques include but are not limited to the techniques of wet catalyst, colloidal catalyst solutions, sol-gel, electrochemical plating, and electroless plating.

The graphitic nanofilament type (nanotube or nanofiber), structure (single-walled, multi-walled, herringbone, etc.), diameter, length and alignment may be controlled by controlling the CVD growth parameters. The growth parameters include but are not limited to carbon source gas, carrier gas, growth temperature, growth pressure, and growth time. For catalytic CVD growth, additional growth parameters may include catalyst parameters such as catalyst size, shape, composition, and catalyst precursors. The parameter ranges and options for catalytic CVD growth, excluding catalyst parameters, may, in general, be applicable to the non-catalytic CVD growth of graphitic nanofilaments, although higher temperatures may be used for the non-catalytic CVD methods.

Generally, the temperatures for the catalytic CVD growth of graphitic nanofilaments may range from about 300 degrees Celsius (° C.) to about 3,000 degrees Celsius (° C.), but preferably from about 600° C. to about 1,200° C., although temperatures lower than 600° C. may be used, especially if the CVD growth is plasma enhanced. The growth pressures may range from about 0.1 Torr to about 1 atmosphere, but more preferably from about 0.1 Torr to about 100 Torr, although lower or higher pressures may also be used. In another embodiment, the growth pressures are above atmospheric pressure, and may range from about 1 atmosphere to about 10 atmospheres. The growth time or "residence time" depends in part on the desired graphitic nanofilament length, with longer growth times producing longer lengths. The growth time may range from about ten seconds to many hours, but more typically from about ten minutes to several hours.

The carbon source gas used for graphitic nanofilament growth may include but is not limited to ethylene, propylene, acetylene, benzene, toluene, ethane, methane, butane, propane, hexane, methanol, ethanol, propanol, isopropanol, carbon monoxide, acetone, oxygenated hydrocarbons, low-molecular-weight hydrocarbons, or combinations thereof. In general, the carbon source gas may comprise any carbon-containing gas or gases, and the carbon source gas may be obtained from liquid or solid precursors for the carbon-containing gas or gases. An auxiliary gas may be used with the carbon source gas to facilitate the growth process. The auxiliary gas may comprise one or more gases, such as carrier gases, inert gases, reducing gases (e.g., hydrogen, ammonia), dilution gases, or combinations thereof, for example. The term "carrier gas" is sometimes used in the art to denote inert gases, reducing gases, and combinations thereof. Some examples of carrier gases are hydrogen, nitrogen, argon, and ammonia.

The CVD growth parameters for graphitic nanofilament growth may also include parameters which facilitate the alignment of the graphitic nanofilaments on a substrate. The alignment parameters may include but are not limited to electric field direction and intensity, catalyst particle density, and substrate pore orientation.

The catalyst particles comprise any suitable catalyst materials for graphitic nanofilament growth, but preferred materials are the transition metals and transition metal oxides. The catalyst materials may include but are not limited to iron, cobalt, nickel, copper, silver, magnesium, ruthenium, rhodium, iridium, platinum, palladium, molybdenum, tungsten, chromium and alloys, oxides, and combinations thereof. Combinations or mixtures of catalyst materials which may be used include but are not limited to iron-nickel, iron-molybdenum, iron-cobalt, cobalt-nickel, and cobalt-molybdenum. Preferred catalysts include iron, cobalt, nickel and alloys thereof.

The catalytic CVD growth of graphitic nanofilaments typically involves the catalytic dissociation of a hydrocarbon source gas into carbon and hydrogen at the surfaces of a transition metal particle which acts as a catalyst. Not wishing to be bound by theory, it is believed that, at high temperatures, the carbon has solubility in the transition metal particle and the carbon dissolves into and diffuses through the metal to form a carbon saturated metal-carbon solution. The carbon precipitates from the saturated solution at one or more surfaces of the metal particle to grow a graphitic nanofilament with a diameter substantially equal to the diameter of the metal particle.

The use of substrates for the catalytic CVD growth of graphitic nanofilaments provides some advantages over "floating" catalytic methods which do not require substrates or supporting surfaces for the catalyst materials. First, in some applications, it may be desirable to form graphitic nanofilaments directly on a surface which forms part of a functional structure. For example, it may be desirable to deposit graphitic nanofilaments at the bottom of a small aperture on a substrate to form a field emission electron source, and space limitations may make direct growth of the graphitic nanofilaments on a surface of the aperture the only practical means to achieve the deposition. Second, the use of a substrate makes it possible to anchor catalyst nanoparticles to a surface in order to control the size of the catalyst nanoparticles. At typical CVD nanofilament growth temperatures (e.g., 500° C. to 900° C.), the catalyst nanoparticles (typically metal) have sufficient mobility and cohesive forces to coalesce into larger particles. The anchoring of the catalyst nanoparticles can prevent such coalescence and help control the diameters of the graphitic nanofilaments. Third, the use of a substrate can facilitate the alignment of the graphitic nanofilaments.

Figure 2C:
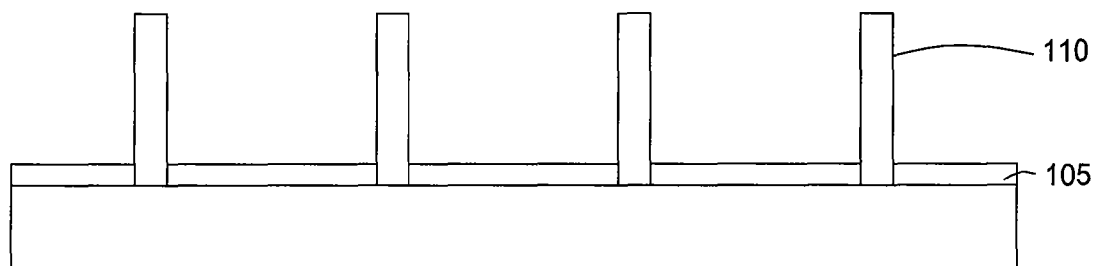

In FIG. 2C, an optional insulator layer 105 may be deposited either to surround each individual anode electrode 110 or to surround the bundles of anode electrodes 110. The insulator layer 105 prevents the deposition of the electrolytic polymer onto the surface of the current collector 111. The insulator layer 105 may comprise a ceramic material, such as aluminum oxide ($Al_2O_3$), aluminum nitride (AlN), silicon oxides such as silicon dioxide ($SiO_2$), or other ceramic materials. In one embodiment, the insulator layer 105 may comprises a non-conductive polymer layer as described herein. In one embodiment, the may comprise a silicon containing material such as amorphous silicon (a-Si). In one embodiment, the insulator layer 105 has a thickness between about 4 nm and about 100 nm. In another embodiment, the insulator layer 105 has a thickness between about 20 nm and about 50 nm. The insulator layer 105 may be deposited using conventional deposition techniques such as, for example, chemical vapor deposition (CVD), plasma enhanced chemical vapor deposition (PECVD), atomic layer deposition (ALD), hot-wire chemical vapor deposition (HWCVD), physical vapor deposition (PVD), and combinations thereof. The selective deposition of the insulator layer 105 is carried out using masking techniques. In one embodiment the masking techniques include using a physical hardmask. In one embodiment, the masking techniques include lithography techniques.

Figure 2D:
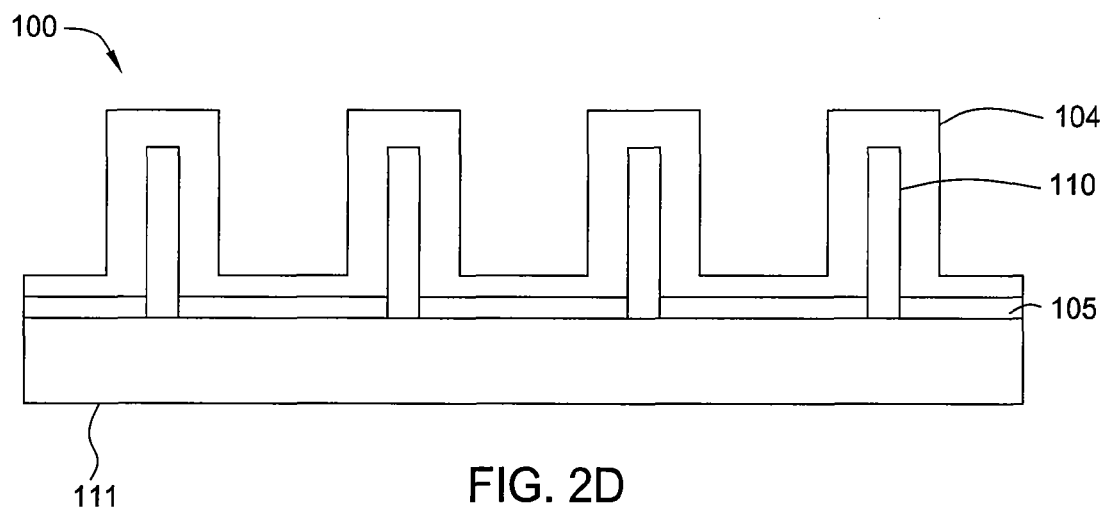

In FIG. 2D, the separator layer 104 is formed over the anode electrode 110 and the optional insulator layer 105 using conformal deposition processes. The separator layer 104 is configured to supply ion channels for movement between the anode structure 102 from the cathode structure 103 while keeping the anode structure 102 and the cathode structure 103 physically separated to avoid a short. In one embodiment, the separator layer 104 may be an electrolytic polymer formed according to embodiments described herein. The separator layer 104 may be a conformal layer. The thickness of the separator layer 104 is generally dependent on the working electrode thickness. In one embodiment, the separator layer 104 has a thickness between about 0.5 microns and about 35 microns. In another embodiment, the separator layer 104 has a thickness between about 0.5 microns and about 5 microns. In another embodiment, the separator layer 104 has a thickness between about 5 microns and about 30 microns. In another embodiment, the separator layer 104 has a thickness between about 10 microns and about 20 microns. In another embodiment, the separator layer 104 has a thickness between about 15 microns and about 18 microns. In one embodiment, the separator layer 104 is a conformal layer. In one embodiment, the electrolytic polymer is selected from the group comprising poly(tetrafluoroethylene) (PTFE), poly(glycidyl methacrylate) (p(GMA)), poly(dimethylaminomethylstyrene) (p(DMAMS), poly(perfluoroalkyl ethylmethacrylate), poly(trivinyltrimethoxy-cyclotrisiloxane), poly(furfuryl methacrylate), poly(cyclohexyl methacrylate-co-ethylene glycol dimethacrylate), poly(pentafluorophenyl methacrylate-co-ethylene glycol diacrylate), poly(2-hydroxyethyl methacrylate-co-ethylene glycol diacrylate), poly(methacrylic acid-co-ethylene glycol dimethacrylate), poly(3,4-ethylenedioxythiophene), silicone (organosiloxanes), and combinations thereof. Silicones are defined as siloxane polymers based on a structure of consisting of alternate silicon and oxygen atoms with various organic radicals attached to the silicon. Examples of suitable silicones include but are not limited to linear polydimethylsiloxane (PDMS). In another embodiment, the separator layer 104 comprises a highly non-conducting porous polymer containing electrolytes such as room temperature ionic liquids.

In embodiments where the separator layer 104 comprises an electrolytic polymer, the electrolytic polymer may be deposited using chemical vapor deposition (CVD) techniques including plasma enhanced chemical vapor deposition (PECVD), atomic layer deposition (ALD), hot-wire chemical vapor deposition (HWCVD), and initiated chemical vapor deposition (iCVD) techniques.

iCVD is considered to be a subset of HWCVD in which selective thermal decomposition of species is achieved using resistively-heated filament wires. Substrates are generally backside cooled to promote absorption of growth species. iCVD differs from HWCVD in that an initiator in addition to the monomer is introduced into the vacuum chemical vapor deposition chamber. Initiators are generally selected such that very low filament temperatures are required to generate radicals for initiation. The radicals serve as starters for polymer chains to which multiple monomer units are added. The use of an initiator not only allows control of chemistry, but also accelerates film growth and provides molecular-weight and rate control. The energy input is low due to the low filament temperature and the need only to decompose the initiator not the monomer. Radicals in the iCVD process are annihilated through termination. Both disproportionation and coupling reactions eliminate radicals and halt addition of monomer units to the chains. The recombination of radicals avoids the presence of dangling bond defects in the resulting polymeric film.

The iCVD growth of the electrolytic polymer involves forming a reactive process gas by flowing a gaseous monomer into a process chamber, flowing a gaseous initiator through a heated filament into the process chamber, exposing a substrate to the reactive process gas, and thermally decomposing the process gas by flowing the process gas over resistively-heated filament wires for a period of time to deposit the electrolytic polymer on the substrate.

Characteristics of the electrolytic polymer structure such as thickness and conformality with underlying structures may be controlled by the iCVD growth parameters. These growth parameters include but are not limited to monomer source gas, initiator source gas, chamber temperature, filament temperature, growth pressure, and growth time. Generally, the growth parameters are selected such that the electrolytic polymer forms a conformal layer over the underlying structure.

The temperature of the filament for the iCVD process is generally dependent upon the initiator source gas. In one embodiment, the temperature of the filament for the iCVD growth of the electrolytic polymer structure may range from about 300 degrees Celsius (° C.) to about 600 degrees Celsius (° C.). In another embodiment the temperature of the filament for the iCVD growth of the electrolytic polymer structure may range from about 400° C. to about 500° C. In another embodiment, the temperatures of the filament may be lower than 400° C. for the iCVD growth of the electrolytic polymer structure. In one embodiment, the temperature of the substrate may be about room temperature (e.g. about 20 to 25° C.).

In one embodiment, the growth pressure may range from about 100 mTorr to about 1 atmosphere. In another embodiment, the growth pressure may range from about 400 mTorr to about 700 mTorr. In another embodiment, the growth pressure may be less than 1,000 mTorr. In another embodiment, the growth pressure may be less than 400 mTorr, although lower or higher pressures may also be used. In another embodiment, the growth pressures are above atmospheric pressure, and may range from about 1 atmosphere to about 10 atmospheres. In one embodiment, the distance from the substrate to the filament is between about 4 cm and about 10 cm. The growth time or "residence time" depends in part on the desired thickness of the electrolytic polymer film, with longer growth times producing a thicker film. The growth time may range from about ten seconds to many hours, but more typically from about ten minutes to several hours.

In one embodiment, the monomer source gas may include tetrafluoroethylene. In general, the monomer source gas may comprise any monomer-containing gas or gases, and the monomer source gas may be obtained from liquid or solid precursors for the monomer-containing gas or gases. In one embodiment, the monomer source gas is selected from the group comprising acrylate monomers, methacrylate monomers, and styrenic monomers, 1-vinyl-2-pyrrolidone, maleic anhydride, and trivinyltri-methylcyclotrisiloxane. In one embodiment, the monomer source gas is selected from the group comprising tetrafluoroethylene, glycidyl methacrylate (GMA), dimethylaminomethylstyrene (DMAMS), perfluoroalkyl ethylmethacrylate, trivinyltrimethoxy-cyclotrisiloxane, furfuryl methacrylate, cyclohexyl methacrylate-co-ethylene glycol dimethacrylate, pentafluorophenyl methacrylate-co-ethylene glycol diacrylate, 2-hydroxyethyl methacrylate-co-ethylene glycol diacrylate, methacrylic acid-co-ethylene glycol dimethacrylate, 3,4-ethylenedioxythiophene, organosiloxanes, and combinations thereof. An auxiliary gas may be used with the monomer source gas to facilitate the growth process. The auxiliary gas may comprise one or more gases, such as carrier gases, inert gases, reducing gases (e.g., hydrogen, ammonia), dilution gases, or combinations thereof, for example. The term "carrier gas" is sometimes used in the art to denote inert gases, reducing gases, and combinations thereof. Some examples of carrier gases are hydrogen, nitrogen, argon, and ammonia.

In one embodiment, the initiator source may include may include molecules selected from the peroxide and azo class of molecules. In one embodiment, the initiator source gas is selected from the group comprising perfluorooctane sulfonyl fluoride (PFOS), perfluorobutane-1-sulfonyl fluoride (PFBS), triethylamine (TEA), tert-butyl peroxide (TBPO), 2,2'-azobis(2-methylpropane), tert-amyl peroxide (TAPO) and benzophenone. In one embodiment, the initiator source gas may include but is not limited to hydrogen peroxide, alkyl peroxides, aryl peroxides, hydroperoxides, halogens, azo compounds, and combinations thereof. In general, the initiator source gas may comprise any initiator-containing gas or gases, and the initiator source gas may be obtained from liquid or solid precursors for the monomer-containing gas or gases.

In certain embodiments it may be advantageous to further include a gaseous cross-linker. Gaseous cross-linker source gases include In one embodiment, the cross-linking agents include, but are not limited to, 2-ethyl-2(hydroxymethyl)propane-trimethyacrylate (TRIM), acrylic acid, methacrylic acid, trifluoro-methacrylic acid, 2-vinylpyridine, 4-vinylpyridine, 3(5)-vinylpyridine, p-methylbenzoic acid, itaconic acid, 1-vinylimidazole, ethylene glycol dimethacrylate, and combinations thereof.

Figure 2E:
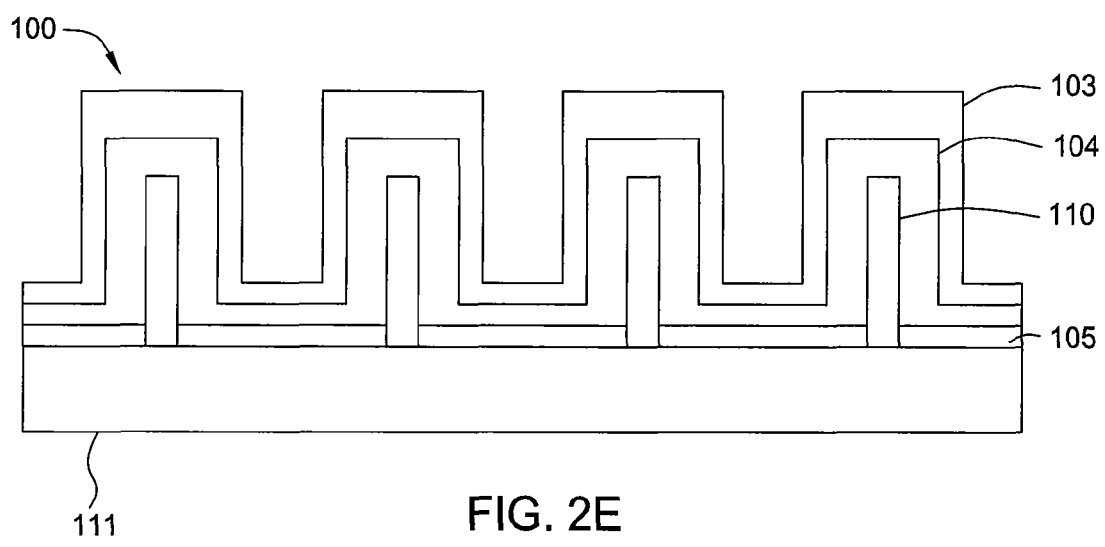

In FIG. 2E, the intercalation host material 112 is formed over the separator layer 104 using conformal deposition processes. The intercalation host material 112 may be made from a layered oxide, such as lithium cobalt oxide, a polyanion, such as lithium iron phosphate, a spinel, such as lithium manganese oxide, or $TiS_2$ (titanium disulfide). Exemplary oxides may be layered lithium cobalt oxide, or mixed metal oxide, such as $LiNi_xCo_{1-2x}MnO_2$, $LiMn_2O_4$. Exemplary phosphates may be iron olivine ($LiFePO_4$) and it is variants (such as $LiFe_{1-x}MgPO_4$), $LiMoPO_4$, $LiCoPO4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, or $Na_5V_2(PO_4)_2F_3$. Exemplary silicates may be $Li_2FeSiO_4$, $Li_2MnSiO_4$, or $Li_2VOSiO_4$. The cathode structure may comprise a lithium containing polymer. In one embodiment, the intercalation host material 112 has a thickness between about 0.5 microns and about 50 microns. In another embodiment, the intercalation host material 112 has a thickness between about 10 microns and about 25 microns. In another embodiment, the intercalation host material 112 has a thickness between about 0.5 microns and about 5 microns. In another embodiment, the intercalation host material 112 has a thickness between about 20 microns and about 25 microns. In another embodiment, the intercalation host material 112 has a thickness between about 13 microns and about 17 microns. In one embodiment, the intercalation host material 112 is a conformal layer. The intercalation host material 112 may be formed using deposition techniques including PVD sputtering, HWCVD, CVD, iCVD, and combinations thereof. In one embodiment, the intercalation host material 112 is a lithium containing polymer. In one embodiment, the lithium containing polymer may comprises any of the aforementioned polymers combined with lithium.

In one embodiment, the temperature of the filament for the iCVD growth of the intercalation host material 112 may range from about 300 degrees Celsius (° C.) to about 800 degrees Celsius (° C.). In another embodiment the temperature of the filament for the iCVD growth of the intercalation host material 112 may range from about 400° C. to about 700° C. In another embodiment, the temperatures of the filament may be lower than 400° C. for the iCVD growth of the intercalation host material 112. In one embodiment, the temperature of the substrate may be from about room temperature (e.g. about 20 to 25 degrees Celsius (° C.)) to about 400 degrees Celsius (° C.).

In one embodiment, the growth pressure may range from about 100 mTorr to about 1 atmosphere. In another embodiment, the growth pressure may range from about 400 mTorr to about 700 mTorr. In another embodiment, the growth pressure may be less than 1,000 mTorr. In another embodiment, the growth pressure may be less than 400 mTorr, although lower or higher pressures may also be used. In another embodiment, the growth pressures are above atmospheric pressure, and may range from about 1 atmosphere to about 10 atmospheres. In one embodiment, the distance from the substrate to the filament is between about 4 cm and about 10 cm. The growth time or "residence time" depends in part on the desired thickness of the electrolytic polymer film, with longer growth times producing a thicker film. The growth time may range from about ten seconds to many hours, but more typically from about ten minutes to several hours.

In general, the monomer source gas may comprise any monomer-containing gas or gases, and the monomer source gas may be obtained from liquid or solid precursors for the monomer-containing gas or gases. In one embodiment, the monomer source gas is selected from the group comprising acrylate monomers, methacrylate monomers, and styrenic monomers, 1-vinyl-2-pyrrolidone, maleic anhydride, and trivinyltri-methylcyclotrisiloxane. In one embodiment, the monomer source gas is selected from the group comprising tetrafluoroethylene, glycidyl methacrylate (GMA), dimethylaminomethylstyrene (DMAMS), perfluoroalkyl ethylmethacrylate, trivinyltrimethoxy-cyclotrisiloxane, furfuryl methacrylate, cyclohexyl methacrylate-co-ethylene glycol dimethacrylate, pentafluorophenyl methacrylate-co-ethylene glycol diacrylate, 2-hydroxyethyl methacrylate-co-ethylene glycol diacrylate, methacrylic acid-co-ethylene glycol dimethacrylate, 3,4-ethylenedioxythiophene, organosiloxanes, and combinations thereof. An auxiliary gas may be used with the monomer source gas to facilitate the growth process. The auxiliary gas may comprise one or more gases, such as carrier gases, inert gases, reducing gases (e.g., hydrogen, ammonia), dilution gases, or combinations thereof, for example. The term "carrier gas" is sometimes used in the art to denote inert gases, reducing gases, and combinations thereof. Some examples of carrier gases are hydrogen, nitrogen, argon, and ammonia.

In general, the initiator source gas may comprise any initiator-containing gas or gases, and the initiator source gas may be obtained from liquid or solid precursors for the monomer-containing gas or gases. In one embodiment, the initiator source gas is selected from the group comprising perfluorooctane sulfonyl fluoride (PFOS), perfluorobutane-1-sulfonyl fluoride (PFBS), triethylamine (TEA), tert-butyl peroxide (TBPO), 2, 2'-azobis (2-methylpropane), tert-amyl peroxide (TAPO) and benzophenone. In one embodiment, the initiator source gas may include but is not limited to hydrogen peroxide, alkyl peroxides, aryl peroxides, hydroperoxides, halogens, azo compounds, and combinations thereof.

In one embodiment, where the intercalation host material 112 is formed using HWCVD growth techniques, the temperature for the catalytic CVD growth of the intercalation host material 112 may range from about 300 degrees Celsius (° C.) to about 3,000 degrees Celsius (° C.), but preferably from about 600° C. to about 1,200° C., although temperatures lower than 600° C. may be used, especially if the CVD growth is plasma enhanced. In one embodiment, the growth pressure may range from about 100 mTorr to about 1 atmosphere. In another embodiment, the growth pressure may range from about 400 mTorr to about 700 mTorr. In another embodiment, the growth pressure may be less than 1,000 mTorr. In another embodiment, the growth pressure may be less than 400 mTorr, although lower or higher pressures may also be used. In another embodiment, the growth pressures are above atmospheric pressure, and may range from about 1 atmosphere to about 10 atmospheres. The growth time or "residence time" depends in part on the desired graphitic nanofilament length, with longer growth times producing longer lengths. The growth time may range from about ten seconds to many hours, but more typically from about ten minutes to several hours. Precursors for HWCVD growth of the intercalation host material 112 include, for example, lithium (Li) based materials, including lithium transition metal oxides, such as $LiMn_2O_4$, $LiCoO_2$, and/or combinations of Ni and Li oxides; exemplary phosphates such as iron olivine ($LiFePO_4$) and it is variants (such as $LiFe_{1-x}MgPO_4$), $LiMoPO_4$, $LiCoPO4$, $Li_3V_2(PO_4)_3$, $LiVOPO_4$, $LiMP_2O_7$, or $LiFe_{1.5}P_2O_7$; exemplary fluorophosphates, such as $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, or $Na_5V_2(PO_4)_2F_3$; and exemplary silicates such as $Li_2FeSiO_4$, $Li_2MnSiO_4$, or $Li_2VOSiO_4$.

Figure 2F:
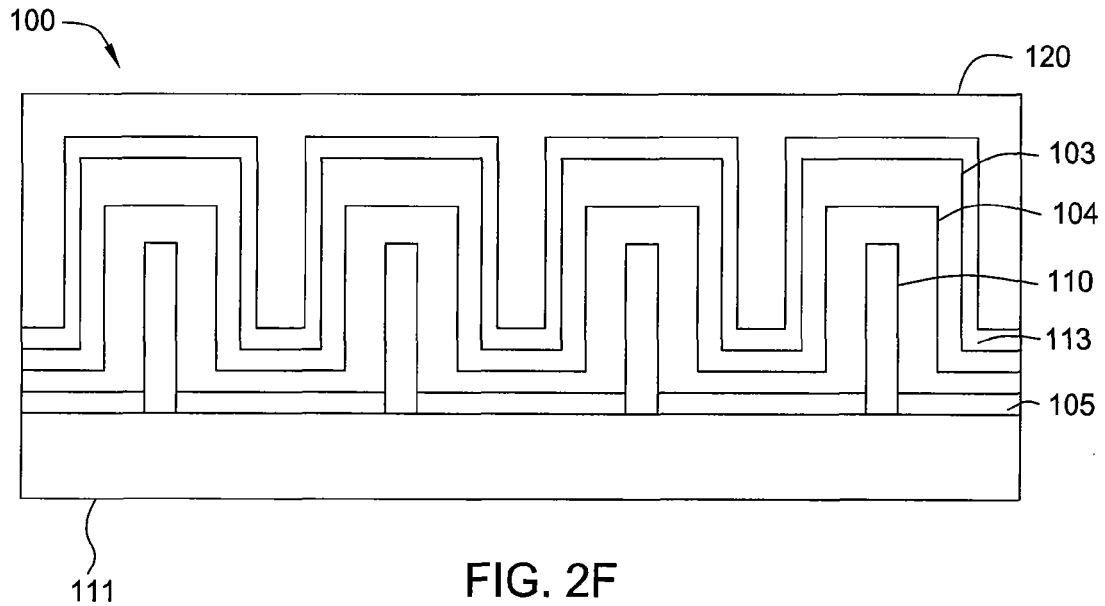

In FIG. 2F a cathodic current collector 113 is formed over the intercalation host material 112 using metal thin-film deposition processes. In one embodiment, the cathodic current collector has a thickness ranging between about 2 microns to about 10 microns. In one embodiment, the cathodic current collector 113 has a thickness of about 0.5 microns to about 5 microns. In another embodiment, the cathodic current collector 113 has a thickness of about 3 microns to about 5 microns. CVD, PVD, thermal evaporation, electrochemical plating, and electroless plating processes may be used to form the cathodic current collector 113. In one embodiment, the cathodic current collector 113 may be a conductive foil. Materials that may be deposited to form the cathodic current collector include copper (Cu), cobalt (Co), nickel (Ni), aluminum (Al), zinc (Zn), magnesium (Mg), tungsten (W), their alloys, their oxides, and/or their lithium-containing compounds. Other materials that may form the cathodic current collector include tin (Sn), tin-cobalt (SnCo), tin-copper (Sn—Cu), tin-cobalt-titanium (Sn—Co—Ti), tin-copper-titanium (Sn—Cu—Ti), and their oxides.

A non-reactive polymer 120 or "packaging polymer" may be deposited on the cathodic current collector 113 in order to avoid reactivity of the surface of the cathodic current collector with the atmosphere. In one embodiment, the non-reactive polymer 120 may comprise any polymer that acts as an insulator and is non-reactive. In one embodiment, the non-reactive polymer 120 may comprise a solid polymer selected from the group comprising polyolefin, polypropylene, polyethylene, and combinations thereof. The non-reactive polymer 120 may be deposited using chemical vapor deposition (CVD) techniques including plasma enhanced chemical vapor deposition (PECVD), atomic layer deposition (ALD), hot-wire chemical vapor deposition (HWCVD), and initiated chemical vapor deposition (iCVD) techniques as discussed above. In one embodiment, the non-reactive polymer 120 has a thickness measured from the top of the cathodic current collector 113 to the top of the non-reactive polymer 120 of between about 0.5 microns and about 50 microns. In another embodiment, the non-reactive polymer 120 has a thickness between about 0.5 microns and about 5 microns. In another embodiment, the non-reactive polymer 120 has a thickness between about 20 microns and about 50 microns. In one embodiment, the non-reactive polymer 120 is a conformal layer. In another embodiment, the non-reactive polymer 120 has a thickness between about 30 microns and about 40 microns. In one embodiment, the non-reactive polymer 120 is a conformal layer.

Generally, the temperatures for the iCVD growth of the non-reactive polymer 120 may range from about 300 degrees Celsius (° C.) to about 600 degrees Celsius (° C.), but preferably from about 400° C. to about 500° C., although temperatures lower than 400° C. may be used. In one embodiment, the growth pressure may range from about 100 mTorr to about 1 atmosphere. In another embodiment, the growth pressure may range from about 400 mTorr to about 700 mTorr. In another embodiment, the growth pressure may be less than 1,000 mTorr. In another embodiment, the growth pressure may be less than 400 mTorr, although lower or higher pressures may also be used. In another embodiment, the growth pressures are above atmospheric pressure, and may range from about 1 atmosphere to about 10 atmospheres. The growth time or "residence time" depends in part on the desired thickness of the electrolytic polymer film, with longer growth times producing a thicker film. The growth time may range from about ten seconds to many hours, but more typically from about ten minutes to several hours.

In general, the monomer source gas may comprise any monomer-containing gas or gases, and the monomer source gas may be obtained from liquid or solid precursors for the monomer-containing gas or gases. In one embodiment, the monomer source gas is selected from the group comprising acrylate monomers, methacrylate monomers, and styrenic monomers, 1-vinyl-2-pyrrolidone, maleic anhydride, and trivinyltri-methylcyclotrisiloxane. In one embodiment, the monomer source gas is selected from the group comprising tetrafluoroethylene, glycidyl methacrylate (GMA), dimethylaminomethylstyrene (DMAMS), perfluoroalkyl ethylmethacrylate, trivinyltrimethoxy-cyclotrisiloxane, furfuryl methacrylate, cyclohexyl methacrylate-co-ethylene glycol dimethacrylate, pentafluorophenyl methacrylate-co-ethylene glycol diacrylate, 2-hydroxyethyl methacrylate-co-ethylene glycol diacrylate, methacrylic acid-co-ethylene glycol dimethacrylate, 3,4-ethylenedioxythiophene, organosiloxanes, and combinations thereof. An auxiliary gas may be used with the monomer source gas to facilitate the growth process. The auxiliary gas may comprise one or more gases, such as carrier gases, inert gases, reducing gases (e.g., hydrogen, ammonia), dilution gases, or combinations thereof, for example. The term "carrier gas" is sometimes used in the art to denote inert gases, reducing gases, and combinations thereof. Some examples of carrier gases are hydrogen, nitrogen, argon, and ammonia.

In general, the initiator source gas may comprise any initiator-containing gas or gases, and the initiator source gas may be obtained from liquid or solid precursors for the monomer-containing gas or gases. In one embodiment, the initiator source gas is selected from the group comprising perfluorooctane sulfonyl fluoride (PFOS), perfluorobutane-1-sulfonyl fluoride (PFBS), triethylamine (TEA), tert-butyl peroxide (TBPO), 2,2'-azobis (2-methylpropane), tert-amyl peroxide (TAPO) and benzophenone. In one embodiment, the initiator source gas may include but is not limited to hydrogen peroxide, alkyl peroxides, aryl peroxides, hydroperoxides, halogens, azo compounds, and combinations thereof.

In certain embodiments it may be advantageous to further include a gaseous cross-linker. Gaseous cross-linker source gases include In one embodiment, the cross-linking agents include, but are not limited to, 2-ethyl-2(hydroxymethyl)propane-trimethyacrylate (TRIM), acrylic acid, methacrylic acid, trifluoro-methacrylic acid, 2-vinylpyridine, 4-vinylpyridine, 3(5)-vinylpyridine, p-methylbenzoic acid, itaconic acid, 1-vinylimidazole, ethylene glycol dimethacrylate, and combinations thereof.

In one embodiment, where the non-reactive polymer 120 is formed using HWCVD growth techniques, the temperature of the filament for the catalytic CVD growth of the cathode structure may range from about 300 degrees Celsius (° C.) to about 3,000 degrees Celsius (° C.). In one embodiment, the temperature of the filament may range from about 600° C. to about 1,200° C., although temperatures lower than 600° C. may be used, especially if the CVD growth is plasma enhanced. The growth pressures may range from about 0.1 Torr to about 1 atmosphere, but more preferably from about 0.1 Torr to about 100 Torr, although lower or higher pressures may also be used. In another embodiment, the growth pressures are above atmospheric pressure, and may range from about 1 atmosphere to about 10 atmospheres. In one embodiment, the growth pressures range from about 400 mTorr to about 10 Torr. The growth time or "residence time" depends in part on the desired graphitic nanofilament length, with longer growth times producing longer lengths. The growth time may range from about ten seconds to many hours, but more typically from about ten minutes to several hours.

Figure 3:
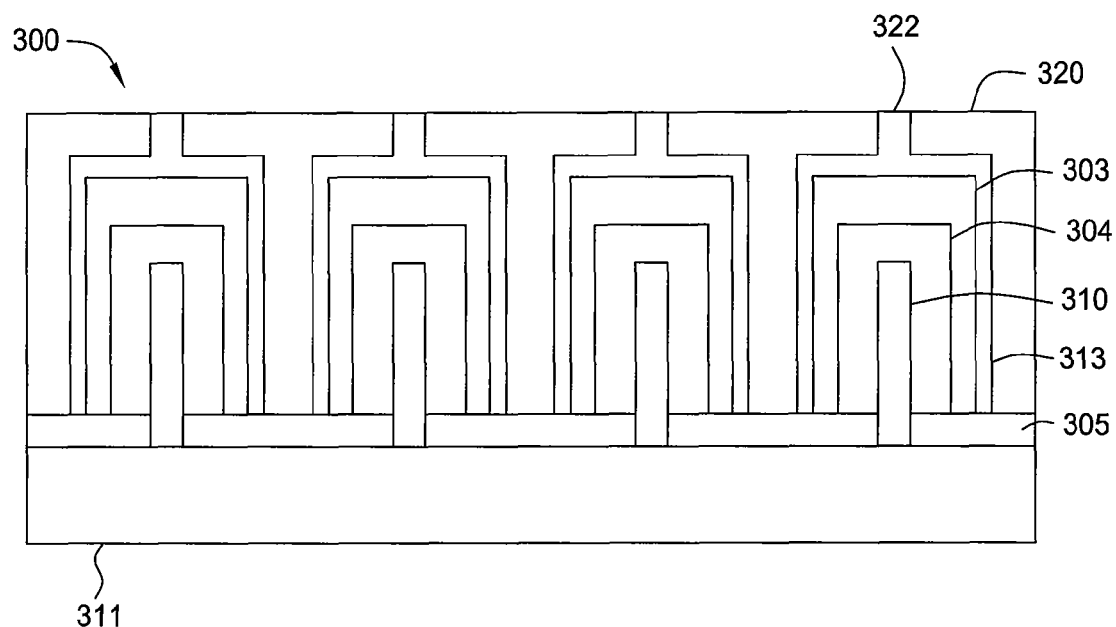
FIG. 3 is a schematic cross-sectional view of one embodiment of an energy storage device formed in accordance with embodiments described herein.

FIG. 3 is a schematic cross-sectional view of one embodiment of an energy storage device 300 formed in accordance with embodiments described herein. Similarly to the Li-ion battery 100 depicted in FIGS. 2A-2F, the energy storage device 300 depicted in FIG. 3 comprises an anode electrode 310, a cathode structure 303, a fluid permeable separator layer 304, an optional insulator layer 305, and an electrolyte (not shown) disposed within the region between the opposing current collectors 311 and 313. A non-reactive polymer 320 is also disposed over each of the cathodic current collectors 313. However, whereas the cathode structure 103 and the cathodic current collector 113 of the Li-ion battery 100 depicted in FIGS. 2A-2F are each formed as continuous layers, each cathode structure 303 and each cathodic current collector 313 as shown in FIG. 3 are formed as separate structures with individual leads 322 for each individual cathode structure 303 and anode structure 310.

Figure 4:
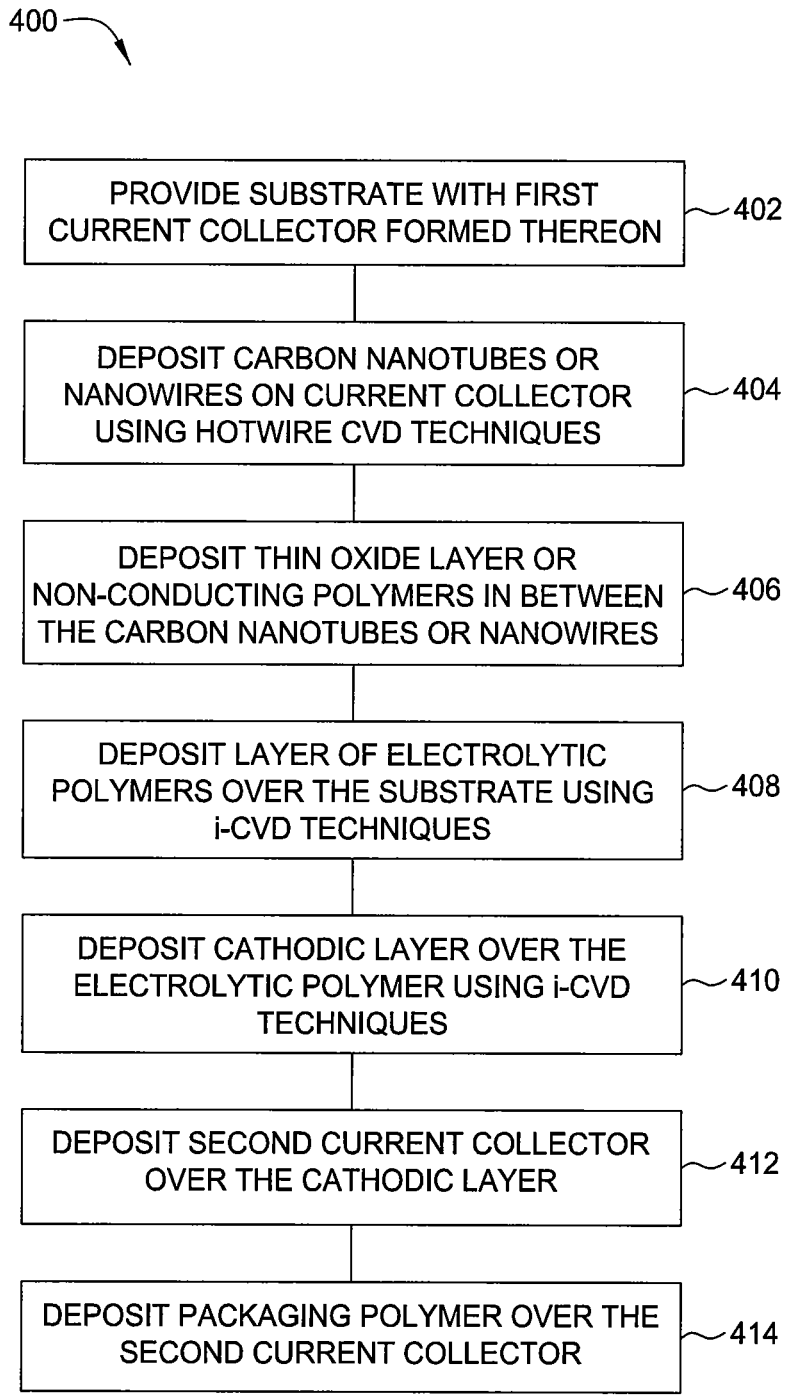
FIG. 4 is a flow diagram of one embodiment of a method for forming an energy storage device in accordance with embodiments described herein.

FIG. 4 is a flow diagram 400 of a method for forming the Li-ion battery 100 device in accordance with embodiments described herein. In block 402, a substrate with a first current collector 111 formed thereon is provided. At block 404, carbon nanotubes or nanowires are formed on the first current collector 111 with the first current collector formed thereon using HWCVD techniques discussed herein. At block 406, an optional insulator layer 105 such as a conformal thin oxide layer or optional conformal non-conducting polymer is selectively deposited to surround the carbon nanotubes or nanowires. At block 408, a separator layer 104 such as a conformal electrolytic polymer layer is deposited over the substrate using i-CVD techniques disused herein. At block 410, a cathodic layer 103 is deposited over the conformal electrolytic polymer layer using i-CVD techniques discussed above. At block 412, a cathodic current collector 113 is formed over the conformal cathodic layer 103. At block 414 a packaging polymer 120 is formed over the cathodic current collector 113.

By using the complete battery cell so formed as a substrate, blocks 402-414 may be performed again to form another complete battery cell thereon. In this way, a complete a battery having multiple cells may be formed in a series of thin-film deposition steps.

Figure 5:
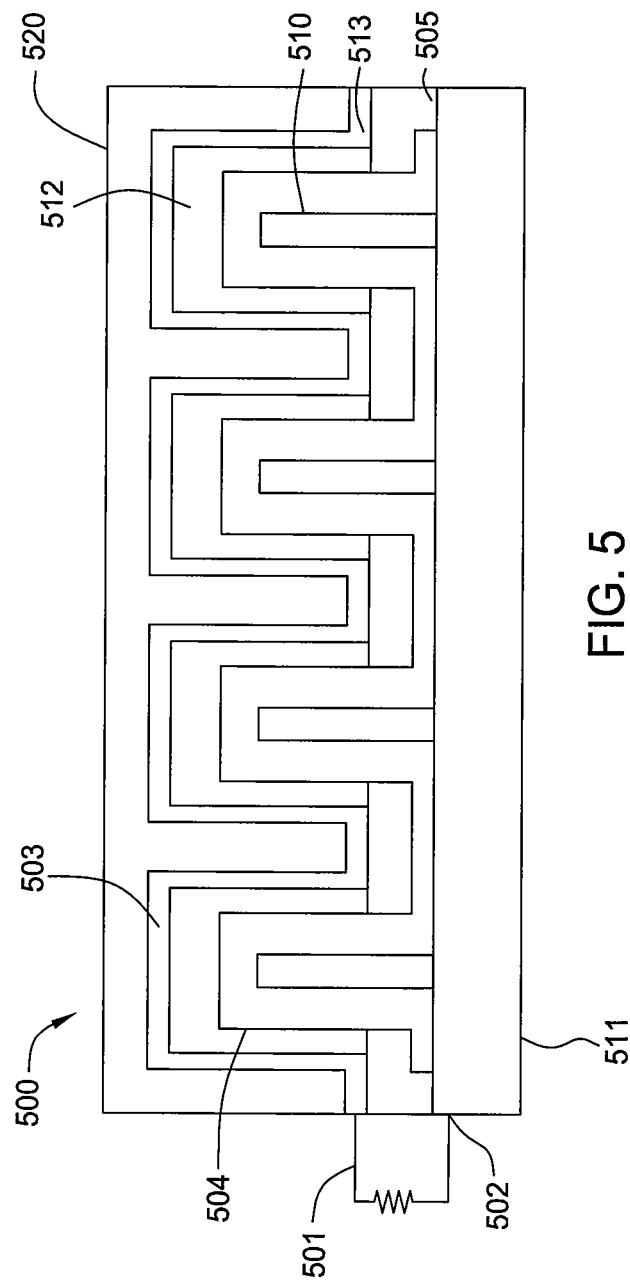
FIG. 5 is a schematic cross-sectional view of another embodiment of an energy storage device formed in accordance with embodiments described herein.

FIG. 5 is a schematic cross-sectional view of another embodiment of a Li-ion battery 500 electrically connected to a load 501, according to one embodiment described herein. The Li-ion battery 500 is similar to the Li-ion battery 100 depicted in FIG. 1 except that the separator layer 504 is formed prior to the insulative layer 505. Similar to the Li-ion battery depicted in FIG. 1, the primary functional components of the Li-ion battery 500 include an anode structure 502, a cathode structure 503, a separator layer 504, and an electrolyte (not shown) disposed within the region between the opposing current collectors 511 and 513. A variety of materials may be used as the electrolyte, such as a lithium salt in an organic solvent. The electrolyte is contained in the anode structure 502, the cathode structure 503, and a fluid-permeable separator layer 504 in the region formed between the current collectors 511 and 513.

The anode structure 502 and the cathode structure 503 each serve as a half-cell of the Li-ion battery 500 and together form a complete working cell of the Li-ion battery 500. The anode structure 502 includes a current collector 511 and an anode electrode 510 that acts as a carbon-based intercalation host material for retaining lithium ions. Similarly, the cathode structure 503 includes a current collector 513 and an intercalation host material 512 for retaining lithium ions, such as a metal oxide. In one embodiment, the separator layer 504 is an electrolytic polymeric, fluid-permeable layer that prevents direct electrical contact between the components in the anode structure 502 and the cathode structure 503. A non-reactive polymer 520 or "packaging polymer" may be deposited on the cathodic current collector 513 in order to avoid reactivity of the surface of the cathodic current collector with the atmosphere.

Energy Storage Device Formation Apparatus

Figure 6:
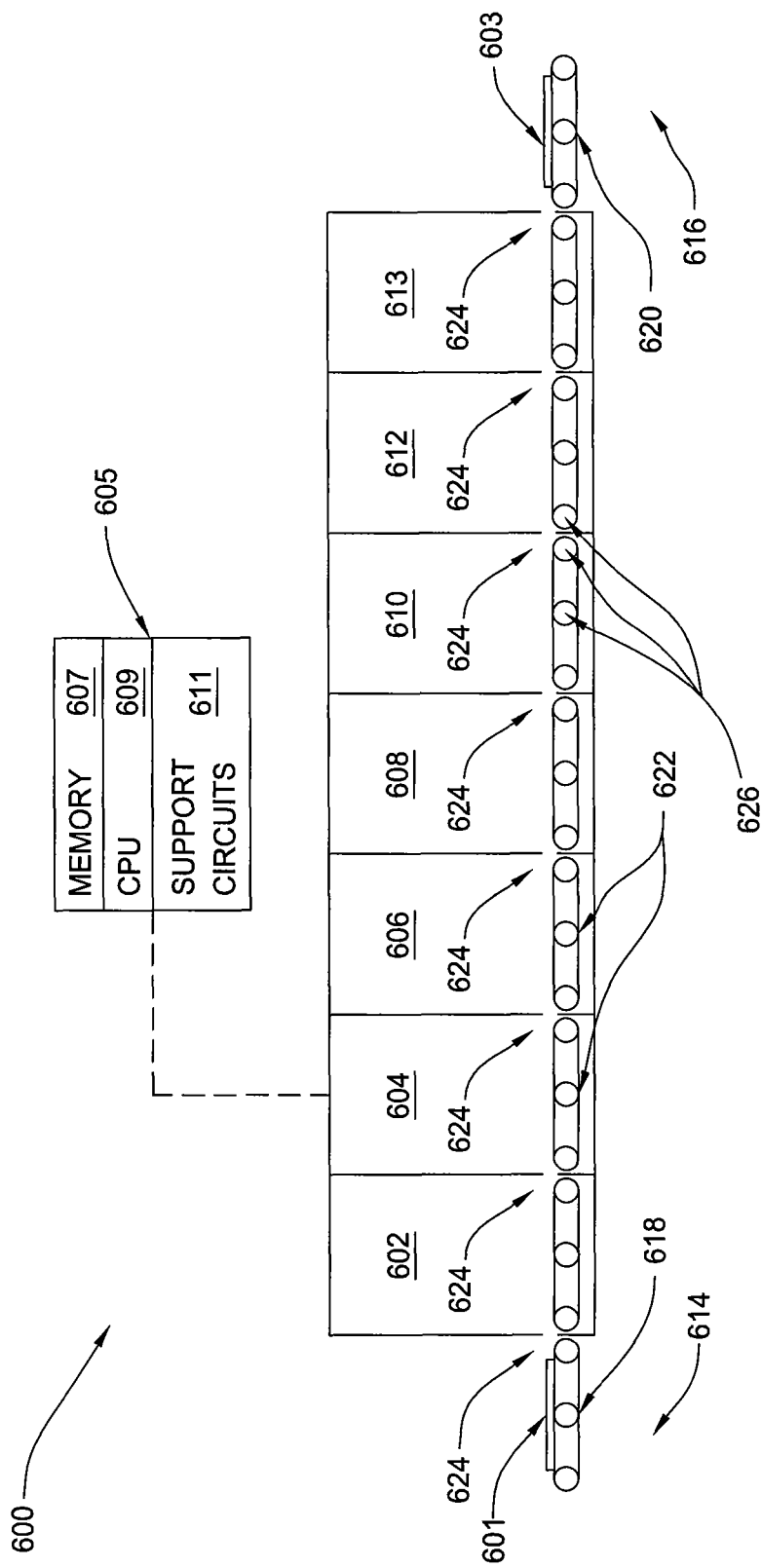
FIG. 6 is a schematic side view of one embodiment of an apparatus for forming an energy storage device on discrete substrates, showing the various chambers for forming the energy storage device.

FIG. 6 is a schematic side view of one embodiment of an apparatus 600 for forming an energy storage device on discrete substrates 601, wherein the apparatus 600 has various chambers 602, 604, 606, 608, 610 and 612 that are used to form the energy storage device on the substrates 601. The apparatus 600 has a first end 614 where substrates 601 enter the apparatus 600, and a second end 616 where substrates 603 with composite materials deposited thereon, exit the apparatus 600. At the first end 614 an input conveyor 618 supports and guides substrates 601 into the first chamber 602. At the second end 616, an exit conveyor 620 receives substrates 603 from the final chamber 612. A series of substrate transfer ports 624 are provided at the entrance and exit of the apparatus and between each of the chambers 602, 604, 606, 608, 610, 612, and 613 to allow the substrates to pass between chambers, while maintaining the required environment within each chamber during processing. A series of intermediate conveyors 622 support and guide the substrates through the various chambers. While the conveyor system has been shown with a number of individual conveyors 618, 620 and 622, a single conveyor with a continuous web of material may be used. In one configuration, the conveyors include support rollers 626 that support and drive the web(s) of material. When individual conveyors 618, 620 and 622 are used, the rollers 626 may be mechanically driven by a common drive system (not shown) such that they are moved in unison, or individually. The various drives for the rollers 626, ports 624 and other system actuators are provided control signals from a system controller 605. While in the embodiment illustrated in FIG. 6, has six chambers, this is not intended to be limiting as to the scope of the invention, since any number of chambers may be provided depending on the number of processes and the required equipment for each process. In one embodiment, the apparatus 600 also contains at least one additional chamber (not shown) at either end 614, 616 of the system that act as a load lock to provide a buffer between the environment external to the apparatus 600 and the processing regions of the chambers 602-612.

The controller 605, used to control the various components in the apparatus 600, generally has a memory 607, a central processing unit (CPU) 609 and support circuits 611. The controller 605 is utilized to control the process sequence of the chambers, regulating the gas flows from gas sources and power application from power sources into the chambers. The CPU 609 may be of any form of a general purpose computer processor that can be used in an industrial setting. The software routines can be stored in the memory 607, such as random access memory, read only memory, floppy or hard disk drive, or other form of digital storage. The support circuits 611 are conventionally coupled to the CPU 609 and may comprise cache, clock circuits, input/output subsystems, power supplies, and the like. The software routines, when executed by the CPU 609, transform the CPU into a specific purpose computer (controller) 605 that controls the process chambers such that the processes are performed in accordance with the present invention. The software routines may also be stored and/or executed by a second controller (not shown) that is located remotely from the apparatus 600.

Figure 7:
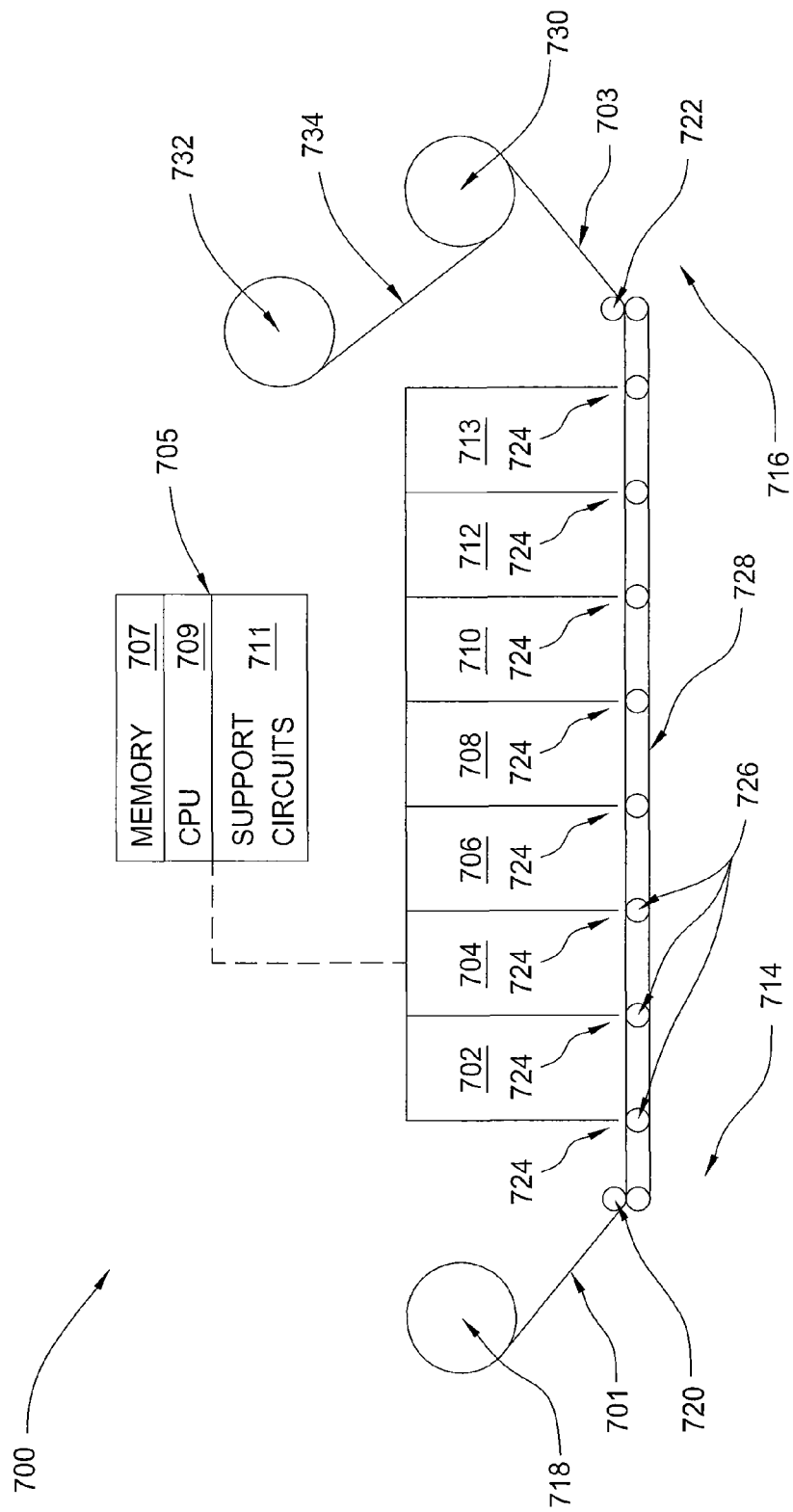
FIG. 7 is a schematic side view of one embodiment of an apparatus for forming an energy storage device in the form of a continuous web, showing the various chambers for forming the energy storage device.

FIG. 7 is a schematic side view of one embodiment of an apparatus 700 for forming composite materials on large area substrates. The substrate(s) in FIG. 7 is in the form of a continuous web 701 of material. As with apparatus 600, apparatus 700 includes various chambers 702, 704, 706, 708, 710, 712, and 713 for forming the composite materials. The apparatus 700 has a first end 714 where a supply roll 718 stores the unprocessed substrate(s), web 701, and feeds the web 701 into the first chamber 702. The apparatus 700 has a second end 716 where a take-up roll 730 receives and stores the processed substrate(s), web 703, with the energy storage device deposited thereon. At the first end 714 a first diverter roller 720 receives web 701 from the supply roll 718, and diverts the web 701 into the first chamber 702. At the second end 716, a second diverter roller 722 receives the processed web 703 from the final chamber 713 and diverts it to the take-up roll 730. In some embodiments, a roll 732 of a protective web of material 734 may be routed unto take-up roll 730. The web of protective material 734 isolates adjacent layers of processed web 703, to thereby protect the web 703 while it is stored and or transported on roll 730.

A series of substrate transfer ports 724 are provided at the entrance and exit of the apparatus 700 and between each of the chambers 702, 704, 706, 708, 710, 712 and 713 to allow the substrates to pass between chambers, while maintaining the required environment within each chamber during processing. A series of rollers 726 supports the web 701 of material as it is guided through the various chambers. In some embodiments, a drive belt 728 may be included to form a conveyor to provide additional support to the web 701 between the rollers 726. The rollers 726 may be mechanically driven by a common drive system (not shown) such that they are controlled in unison, thereby avoiding wrinkling or stretching of the web 701. While in the embodiment of FIG. 7, six chambers are shown, more or less chambers may be provided depending on the number of processes and the required equipment for each process. In one embodiment, the apparatus 700 also contains at least one additional chamber (not shown) at either end 714, 716 of the system that act as a load lock to provide a buffer between the environment external to the apparatus 700 and the processing regions of the chambers 702-713. The various drives for the supply roll 718, take-up roll 730, rollers 726, ports 724 and other system actuators are provided control signals from a system controller 705. The controller 705 has a memory 707, a central processing unit (CPU) 709 and support circuits 711 that are coupled to the apparatus 700. The controller 705 is utilized to control the process sequence of the chambers, regulating the gas flows from gas sources and power application from power sources into the chambers. The CPU 709 may be of any form of a general purpose computer processor that can be used in an industrial setting. The software routines can be stored in the memory 707, such as random access memory, read only memory, floppy or hard disk drive, or other form of digital storage. The support circuits 711 are conventionally coupled to the CPU 709 and may comprise cache, clock circuits, input/output subsystems, power supplies, and the like. The software routines, when executed by the CPU 709, transform the CPU into a specific purpose computer (controller) 705 that controls the process chambers such that the processes are performed in accordance with the present invention. The software routines may also be stored and/or executed by a second controller (not shown) that is located remotely from the apparatus 700.

Figure 8:
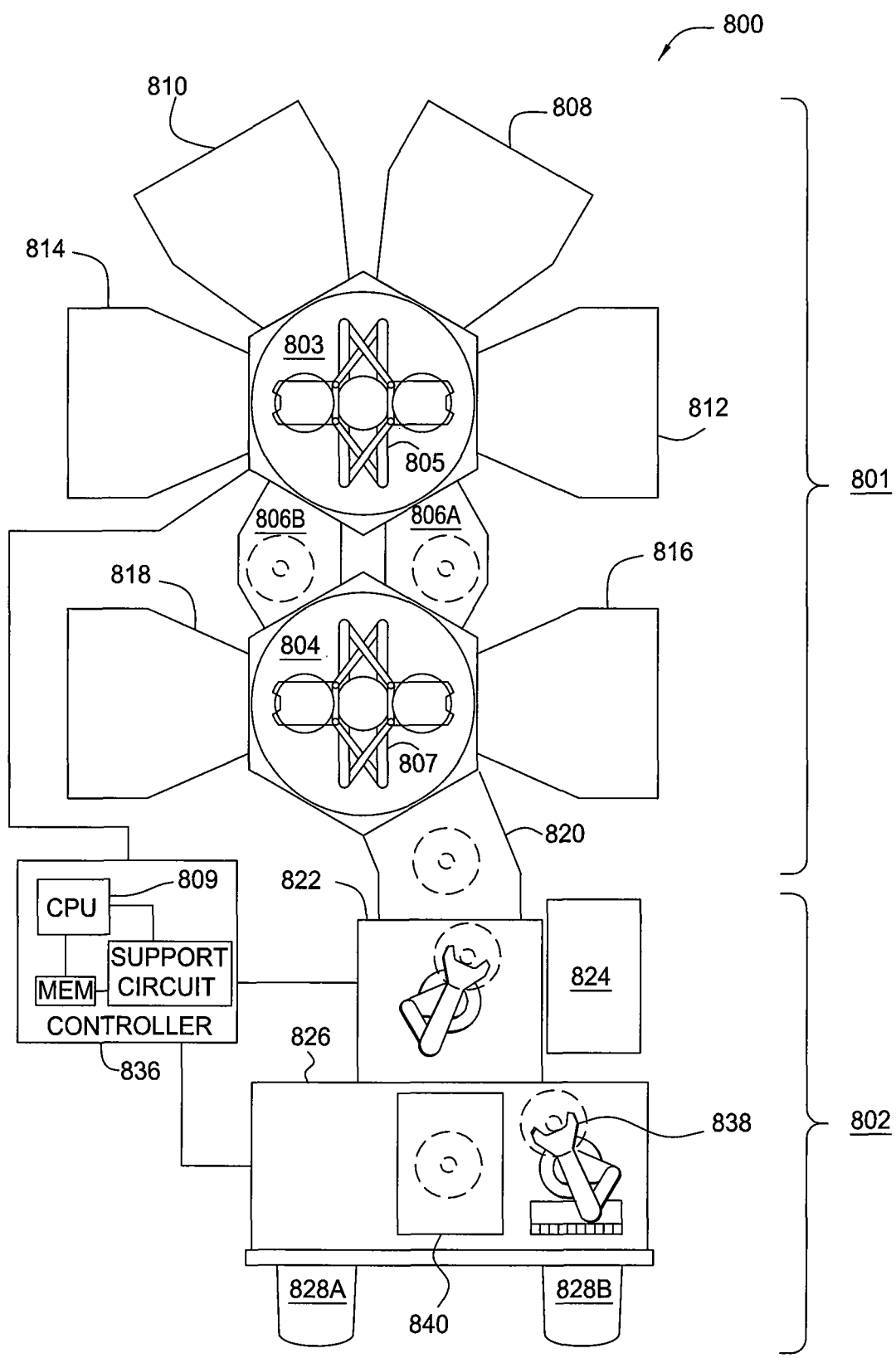
FIG. 8 is a schematic plan view of a further embodiment of an apparatus for forming an energy storage device on discrete substrates, showing the various chambers for forming the composite materials.

FIG. 8 is a schematic plan view of a further embodiment of a substrate processing system (e.g., cluster tool 800) for forming an energy storage device on discrete substrates, showing the various chambers for forming the energy storage device. The tool 800 includes a vacuum-tight processing platform 801, a factory interface 802, and a system controller 836. The platform 801 comprises a plurality of processing modules 808, 810, 812, 814, 816, 818, 824 and at least one load-lock chamber (a load-lock chamber 820 is shown), which are coupled to vacuum substrate transfer chambers 803, 804. The factory interface 802 is coupled to the transfer chamber 804 by the load lock chamber 820.

In one embodiment, the factory interface 802 comprises at least one docking station 826, at least one substrate transfer robot 838, at least one substrate transfer platform 840, at least one precleaning chamber 824, and a precleaning robot 822. In one embodiment, the docking station 826 is configured to accept at least one front opening unified pod (FOUP). Two FOUPs 828A, 828B are shown in the embodiment of FIG. 8, but any number of FOUPs may be provided within the physical limits of the docking station 826. The substrate transfer robot 838 is configured to transfer the substrate from the factory interface 802 to the precleaning chamber 824 wherein a precleaning process may be performed. The precleaning robot 822 is configured to transfer the substrate from the precleaning chamber 824 to the loadlock chamber 820. Alternatively, the substrate may be transferred from the factory interface 802 directly to the loadlock chamber 820, by-passing the precleaning chamber 824.

The loadlock chamber 820 has a first port coupled to the factory interface 802 and a second port coupled to a first transfer chamber 804. The loadlock chamber 820 is coupled to a pressure control system (not shown) which pumps down and vents the chamber 820 as needed to facilitate passing the substrate between the vacuum environment of the transfer chamber 804 and the substantially ambient (e.g., atmospheric) environment of the factory interface 802.

The first transfer chamber 804 has a first robot 807 disposed therein. The first robot 807 transfers substrates between the loadlock chamber 820, the processing modules 816 and 818, and two substrate transfer platforms 806A and 806B. The second transfer chamber 803 has a second robot 805 disposed therein. The second robot 805 transfers substrates between the two substrate transfer platforms 806A and 806B and the processing modules 808, 810, 812 and 814. The two substrate transfer platforms 806A, 806B are disposed between the transfer chamber 804 and the transfer chamber 803 to facilitate transfer of the substrate between the robot 805 and the robot 807. The platforms 806A, 806B can either be open to the transfer chambers 803, 804 or be selectively isolated (i.e., sealed) from the transfer chambers 803, 804 to allow different operational pressures to be maintained in each of the transfer chambers 803, 804.

In one embodiment, the processing chambers coupled to the first transfer chamber 804 may be a physical vapor deposition (PVD) chamber 818 and a chemical vapor deposition (CVD) chamber 816, for performing a CVD process such as hot-wire CVD (HWCVD). The processing chambers coupled to the second transfer chamber 803 may be a second PVD chamber 814, a HWCVD chamber 810, a third PVD chamber 808, and a degas chamber 812. Suitable CVD, PVD, HWCVD and degas processing chambers are available from Applied Materials, Inc., located in Santa Clara, Calif.

The system controller 836, which may be similar to the system controller 605 described above, is coupled to the integrated processing tool 800. The system controller 836 controls the operation of the tool 800 using a direct control of the process chambers of the tool 800 or alternatively, by controlling the computers (or controllers) associated with the process chambers and tool 800. In operation, the system controller 836 enables data collection and feedback from the respective chambers and system to optimize performance of the tool 800. The software routines, such as an energy storage device deposition process described above with reference to FIG. 4, when executed by the CPU 809, transform the CPU into a specific purpose computer (controller) 836. The software routines may also be stored and/or executed by a second controller (not shown) that is located remotely from the tool 800.

With respect to the above apparatus 600, 700, and 800, it should be understood that the various components of the chambers of each of these apparatus are useable within the chambers of the other apparatus. The components shown in FIGS. 9A-15 and described below with respect to chambers 602, 602', 604, 606, 608, 610, 612, and 613 are also capable of being incorporated into the chambers of apparatus 600, 700 and 800. The different methods of making energy storage devices can each be formed or performed in any of the above described apparatus 600, 700, and 800. Further, the formation of these composite materials may also be accomplished by performing some steps in one type of apparatus, while performing other steps in another type of apparatus.

Figure 9A:
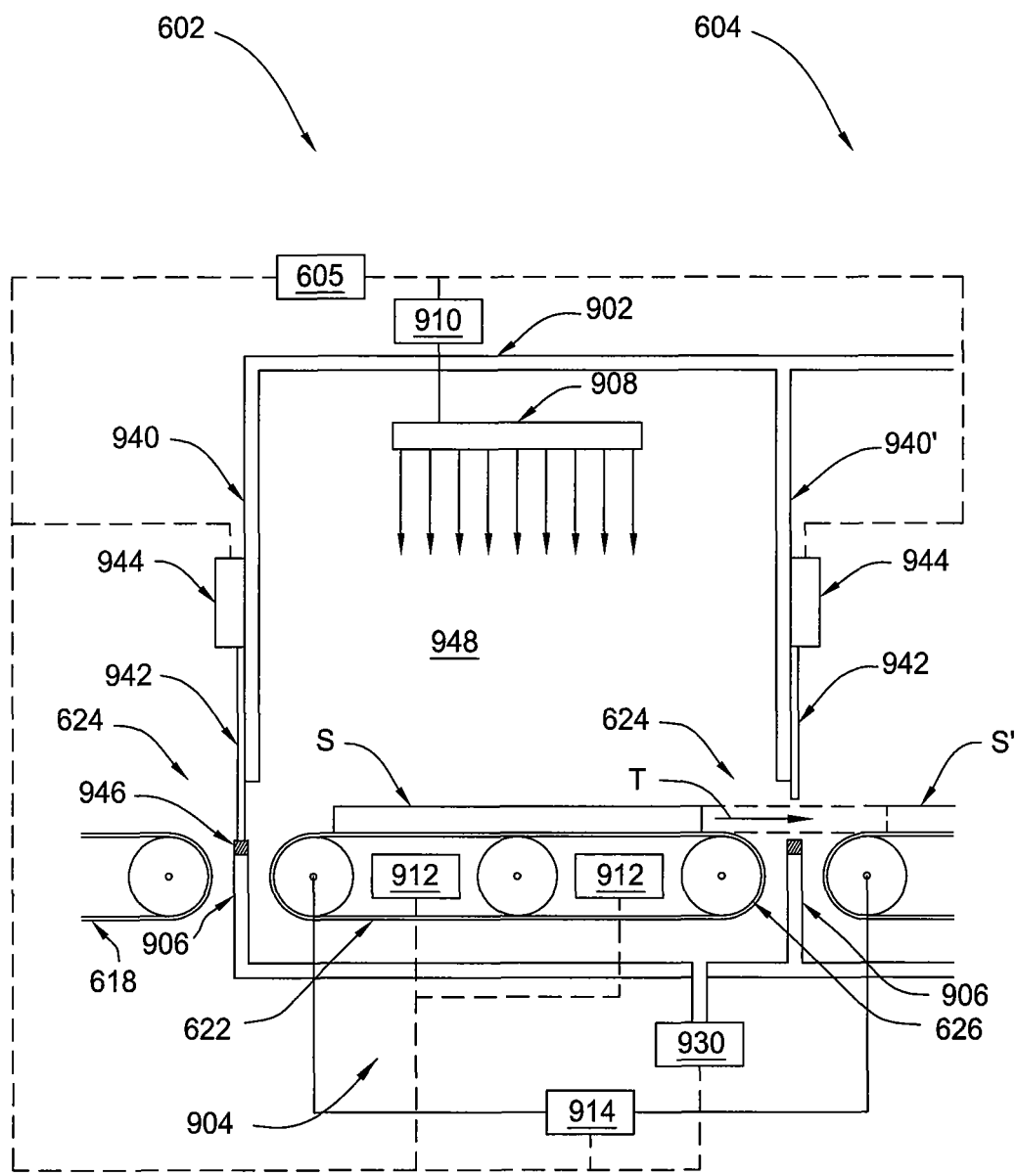
FIG. 9A is a schematic side view of one embodiment of a chamber for depositing catalyst material on substrates.

FIG. 9A shows a schematic side view of one embodiment of a chamber 602 for depositing catalyst material on a substrate S. In this embodiment, the chamber 602 includes a first wall 940 facing the first end 614 of apparatus 600 and a second wall 940' between chamber 602 and chamber 604 (see FIG. 6). While second wall 940' is shown as a shared wall between chambers 602 and 604, double walls may be used if required (e.g., to provide greater insulation between chambers). Chamber 602 also includes a top 902, that may be a common one-piece top for all of the chambers as shown, or each chamber could be provided with a separate top. FIG. 9A also illustrates a further embodiment of substrate transfer ports 624 that are positioned on the walls 940 and 940'. Walls 940 and 940' include a lower portion 906 that connects to the chamber bottom 904, below the substrate transfer ports 624. As with the top 902, chamber bottom 904 may be a common one-piece bottom for all of the chambers as shown, or each chamber could be provided with a separate bottom.

Each of the substrate transfer ports 624 as shown in FIG. 9A, are generally closeable and is mounted on the chamber wall. A closeable door 942 is sealed with the wall and contacts an elastomeric strip 946 on top of the lower portion 906 of the wall to seal the substrate transfer port 624. An actuator 944, extends and retracts the door 942, based on commands received from the support circuits 611 (FIG. 6) of the system controller 605. When the door 942 is in the closed position as shown on the left in FIG. 9A, the chamber 602 is sealed so that regions on either side of the door 942 are isolated from each other. In one embodiment, the door 942 is a conventional gate valve that is configured to prevent gas leakage through the substrate transfer port 624. During processing the doors 942 are closed so that a processing region 948 is formed between the chamber walls 940, the top 902 of the chamber, and the bottom 904 of the chamber and doors 942 so that one or more substrate processing steps may be performed therein. After the process associated with each chamber is performed, the doors 942 of each chamber are opened as shown on the right side of FIG. 9A. The conveyors 622 (as well as the input conveyor 618 and the exit conveyor 620) advance the substrates "S" in the direction "T" into the subsequent chamber, based on commands received by a drive mechanism 914 from the support circuits 611 (FIG. 6) of the system controller 605, as shown for example by substrate S'. The doors 942 can then be reclosed and the appropriate processes performed on the substrates S. It should be noted that other embodiments of substrate transfer ports may also be used in conjunction with chamber 602 or any of the other chambers of apparatus 600, 700, or 800.

In one embodiment, a pumping device 930 is coupled to the processing region 948 to evacuate and control the pressure therein. The pumping device 930 may be a conventional rough pump, roots blower, turbo pump or other similar device that is adapted control the pressure in the processing region 948. In one embodiment, the pressure level of the processing region 948 of the chamber 602 may be maintained at less than about 760 Torr. In one embodiment, the pressure level of the processing region 948 of the chamber 602 may be maintained at about 1 Torr or less. In another embodiment, the pressure level within the chamber 602 may be maintained at about $10^{-3}$ Torr or less. In yet another embodiment, the pressure level within the chamber 602 may be maintained at about $10^{-3}$ Torr to about $10^{-7}$ Torr.

In one embodiment, the chamber 602 of FIG. 9A, is configured and adapted to deposit the layer of catalyst material on a substrate S during block 404, using a sputtering deposition process. A target 908 of the catalyst material is provided in the chamber 602. A power source 910 is connected to the target 908 so that a cathodic DC and/or RF bias can be applied to the target 908 so that the catalytic material can be deposited on the surface of the substrate S. The plasma generated by the bias applied to the target 908 causes atoms from the target surface to be removed, and be deposited on the exposed surfaces of the substrate S. In embodiments requiring heating of the substrates, one or more heating elements 912 may be provided. The heating elements 912 may comprise resistive heating elements, induction coils, or other heating means. In batch-type systems, once the layer of catalytic material is deposited on the substrate S, (and the other chambers' processes are complete as described below), the doors 942 of the chambers are opened and the substrates are advanced to the next chamber in the fabrication process. In continuous systems, the speed of the conveyors 622 are maintained to provide the correct residence time within the chamber 602, to deposit the required thickness of the catalyst layer such as about 0.2 nm to about 20 nm, as described above.

Figure 9B:
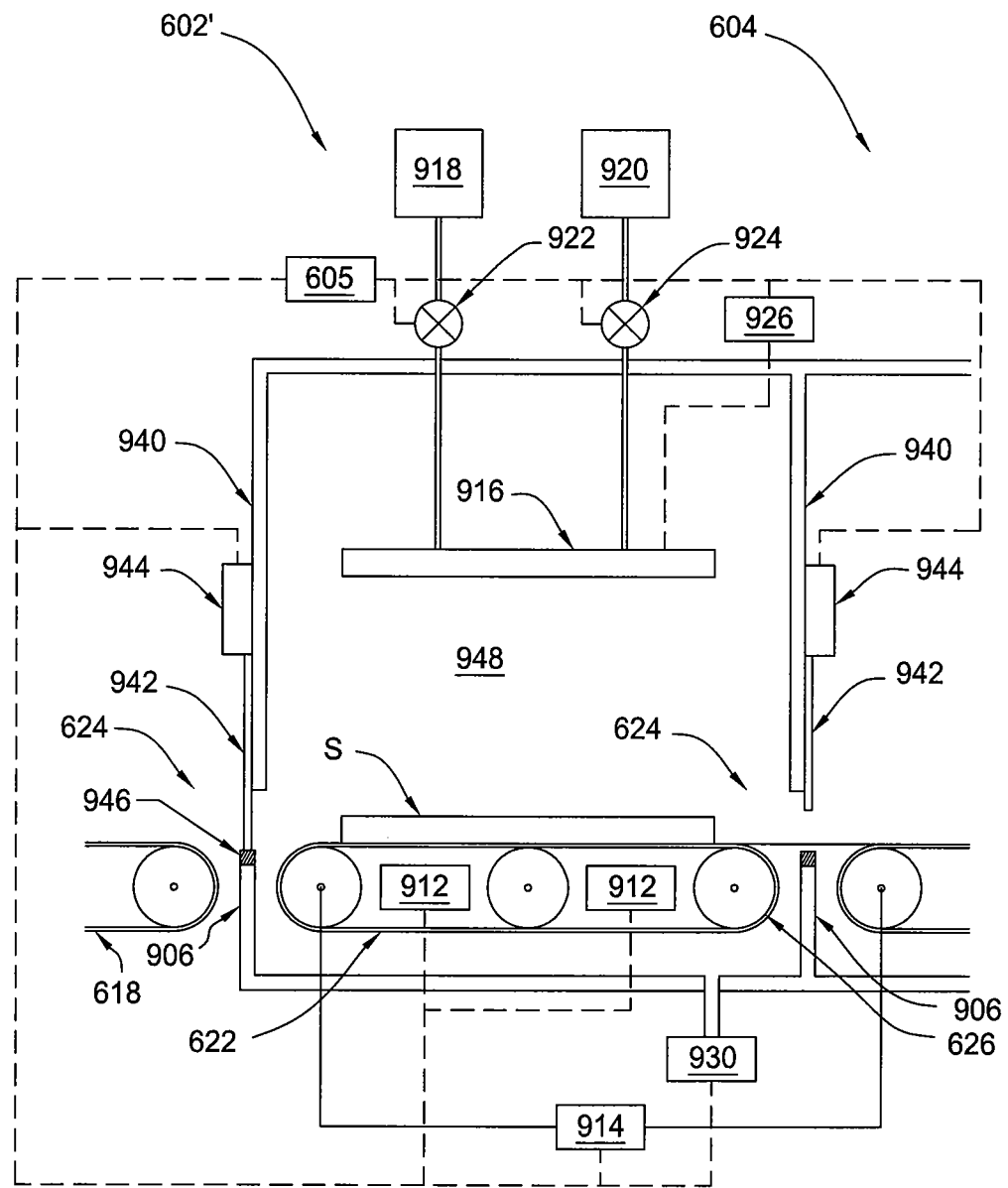
FIG. 9B is a schematic side view of another embodiment of a chamber for depositing catalyst material on substrates.

In another embodiment, during block 404, a chamber 602' of FIG. 9B is used to deposit catalyst material on the substrates S using a chemical vapor deposition (CVD) process. One will note that the components found in chamber 602' (and the other chambers as described below) are generally similar to the components founds in chamber 602 in FIG. 9A, and thus have the same reference designators, and are not described with reference to FIG. 9B. In chamber 602', process gasses are provided to a showerhead 916 from one or more gas sources 918, 920 via valves 922, 924, respectively. Valves 922, 924 are controlled by signals received from the support circuits 611 of the system controller 605. The process gasses provided to the showerhead 916 include gasses used to form the catalytic material, such as metal organic precursors. While in this embodiment, two gas sources 918, 920 are shown, a single gas source or a plurality of gas sources may be provided depending on the number and combination of gases used. To improve the film quality, increase the deposition rate and/or film uniformity, the CVD process may be enhanced by applying a bias to the showerhead 916 and/or substrate S. In one embodiment, a power supply 926 is configured to RF bias the showerhead 916 based on signals received from the support circuits 611 of the system controller 605. The applied voltage may be RF, DC or AC depending on system requirements. In another embodiment, an inductively coupled plasma may also be formed in the processing region 948 by use of the power supply 926 and one or more coils (not shown) which are positioned to generate a plasma therein.

Figure 10:
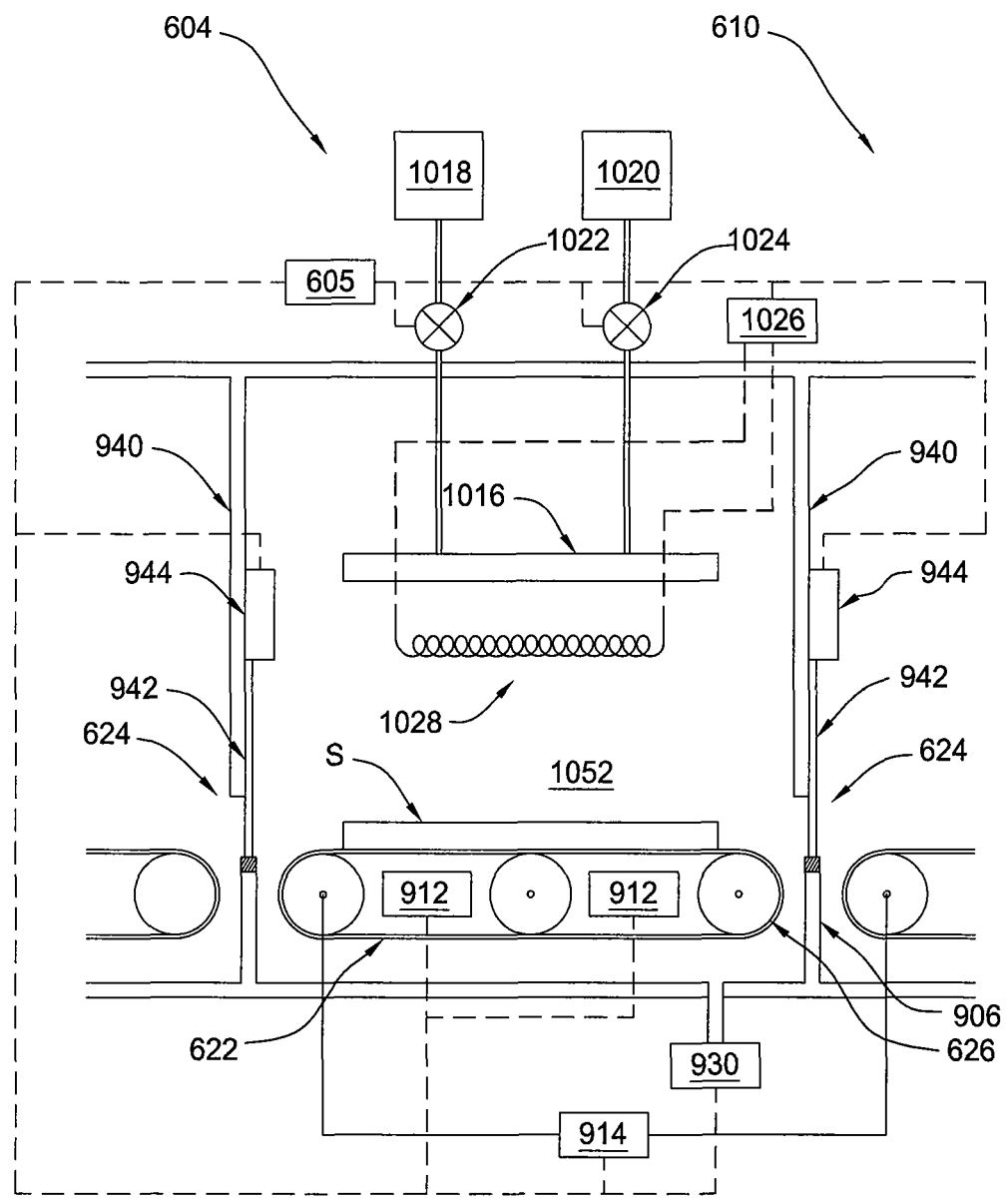
FIG. 10 is a schematic side view of one embodiment of a chamber for depositing carbon nanotubes on substrates.

FIG. 10 is a schematic side view of one embodiment of a chamber for depositing carbon nanotubes on substrate. During block 404, as illustrated in FIG. 2B, carbon nanotubes are deposited over the substrate. In one embodiment, the carbon nanotubes are formed over the carbon nanotubes using a hot wire chemical vapor deposition (HWCVD) process. In one embodiment, as shown in FIG. 10, a chamber 604 is configured and adapted to deposit the carbon nanotubes on the substrate using a HWCVD process. The HWCVD process generally uses a hot filament (usually tungsten or tantalum) to "crack" the reactive gas components (e.g., silane and hydrogen) into atomic radicals. The hot filament is typically maintained at a surface temperature significantly higher than 1,500° C. The reactive species, after passing across the surface of the hot filament, are transported through a processing region 1052 to the substrate in a low pressure ambient which enables a high deposition rate without gas-phase particle formation. To accomplish this, the chamber 604 includes a showerhead 1016 that receives process gasses from one or more gas sources 1018, 1020 via valves 1022, 1024, respectively. The valves 1022, 1024 are controlled by signals received from the support circuits 611 of the system controller 605. To assist in the CVD process, a resistive wire 1028 is placed in close proximity to the substrate S. Electrical current is supplied to the wire 1028 by a power supply 1026, based on signals received from the support circuits 611 of the system controller 605. The electrical current heats the wire 1028 to form the carbon nanotubes on the substrate S.

Figure 11:
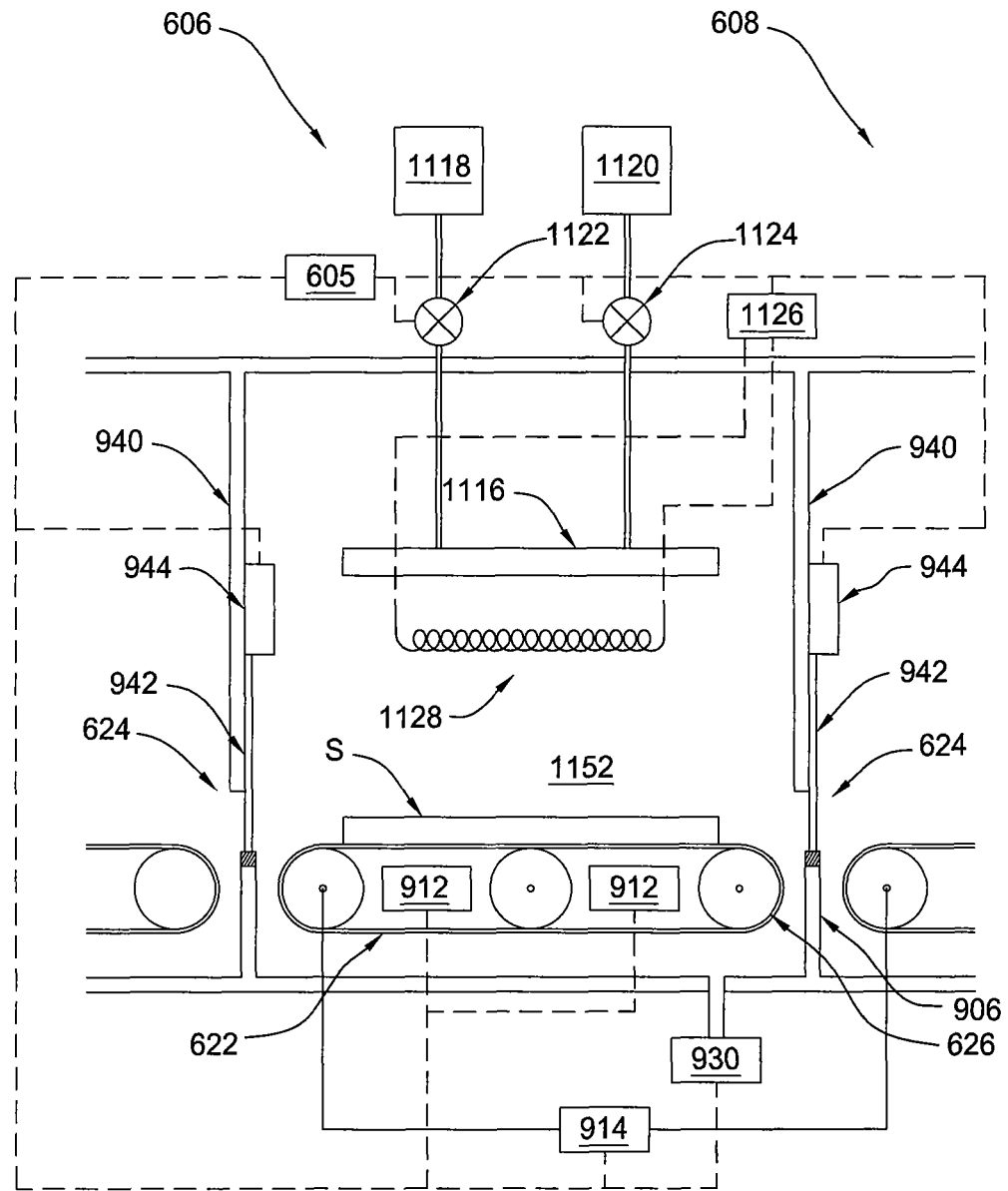
FIG. 11 is a schematic side view of one embodiment of a chamber for depositing polymeric material on substrates.

FIG. 11 is a schematic side view of one embodiment of a chamber 606 for depositing polymeric material on substrates. Next, during block 406, as illustrated in FIG. 2C, a non-conducting polymeric layer is deposited over the substrate to surround the carbon nanotubes. In one embodiment, chamber 606 of FIG. 11 is configured and adapted to deposit a non-conductive polymer over the substrate using an initiated chemical vapor deposition (iCVD) process. The iCVD process generally involves the vapor phase delivery of both initiator species and monomers into a processing region 1152 of the processing chamber 606 that is maintained in a vacuum state. In one embodiment, the non-conducting polymeric material is formed on the surface of the substrate by use of an iCVD process. In one embodiment, the chamber 606 is configured to deposit the non-conducting polymer using a low temperature iCVD process in which the filament temperature is maintained at a temperature between about 300° C. and 450° C., such as about 400° C. In the chamber 606 a showerhead 1116 receives process gasses from one or more gas sources 1118, 1120 via valves 1122, 1124, respectively. The valves 1122, 1124 are controlled by signals received from the support circuits 611 of the system controller 605. One of the gas sources may include the initiator species. To assist in the CVD process, a resistive wire 1128 is placed in close proximity to the substrate S. Electrical current is supplied to the wire 1128 by a power supply 1126, based on signals received from the support circuits 611 of the system controller 605. The electrical current heats the wire 1128 to form the carbon nanotubes on the substrate S.

Figure 12:
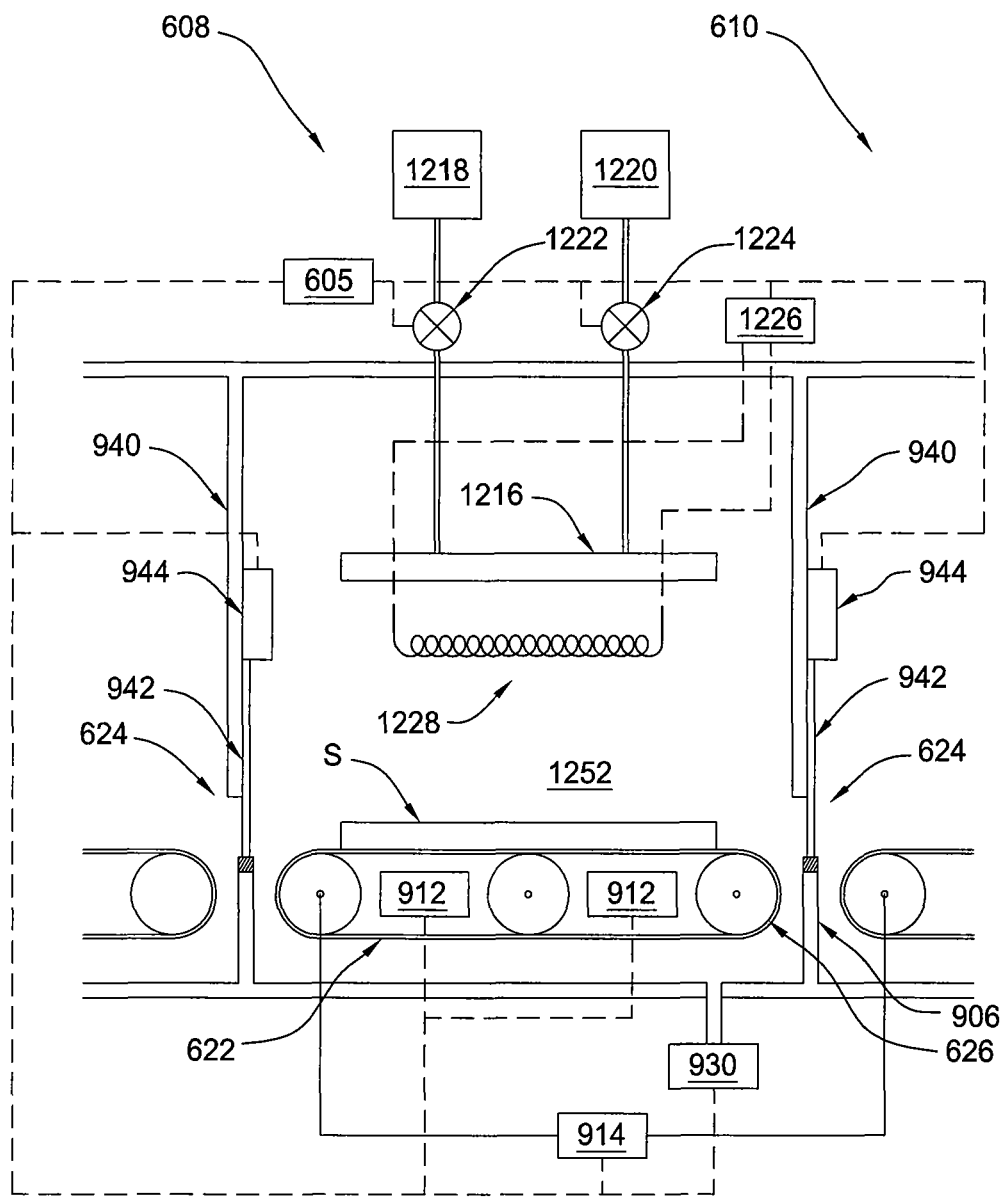
FIG. 12 is a schematic side view of one embodiment of a chamber for depositing polymeric material on substrates.

FIG. 12 is a schematic side view of one embodiment of a chamber 608 for depositing polymeric material on substrates. Next, during block 408, as illustrated in FIG. 2D, an electrolytic polymeric layer is deposited over the carbon nanotubes. In one embodiment, chamber 608 of FIG. 12 is configured and adapted to deposit an electrolytic polymer over the substrate using an initiated chemical vapor deposition (iCVD) process. The iCVD process generally involves the vapor phase delivery of both initiator species and monomers into a processing region 1252 of the processing chamber 608 that is maintained in a vacuum state. In one embodiment, the electrolytic polymer is formed on the surface of the substrate by use of an iCVD process. In one embodiment, the chamber 608 is configured to deposit the electrolytic polymer using a low temperature iCVD process in which the filament temperature is maintained at a temperature between about 300° C. and 450° C., such as about 400° C. In the chamber 608, a showerhead 1216 receives process gasses from one or more gas sources 1218, 1220 via valves 1222, 1224, respectively. The valves 1222, 1224 are controlled by signals received from the support circuits 611 of the system controller 605. One of the gas sources may include the initiator species. To assist in the CVD process, a resistive wire 1228 is placed in close proximity to the substrate S. Electrical current is supplied to the wire 1228 by a power supply 1226, based on signals received from the support circuits 611 of the system controller 605. The electrical current heats the wire 1228 to form the carbon nanotubes on the substrate S.

Figure 13:
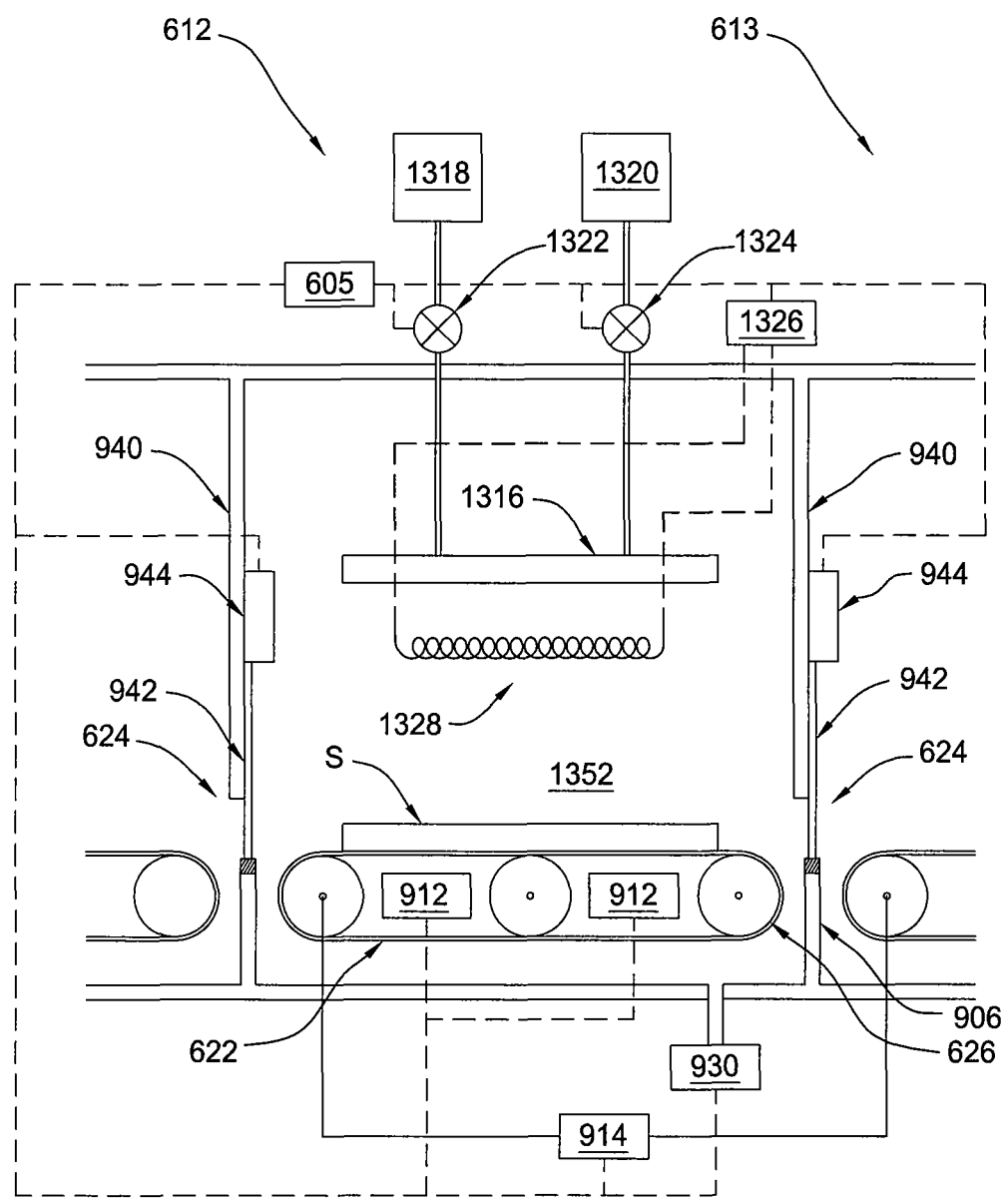
FIG. 13 is a schematic side view of one embodiment of a chamber 610 for depositing cathodic material on substrates.

FIG. 13 is a schematic side view of one embodiment of a chamber 610 for depositing cathodic material on substrates. Next, during block 410, as illustrated in FIG. 2E, a conformal cathodic layer is deposited over the electrolytic polymer. In one embodiment, chamber 610 of FIG. 13 is configured and adapted to deposit an electrolytic polymer over the substrate using an initiated chemical vapor deposition (iCVD) process. The iCVD process generally involves the vapor phase delivery of both initiator species and monomers into a processing region 1352 of the processing chamber 608 that is maintained in a vacuum state. In one embodiment, the cathodic layer is formed on the electrolytic polymer by use of an iCVD process. In one embodiment, the chamber 610 is configured to deposit the cathodic layer using a low temperature iCVD process in which the filament temperature is maintained at a temperature between about 300° C. and 450° C., such as about 400° C. In the chamber 608, a showerhead 1316 receives process gasses from one or more gas sources 1318, 1320 via valves 1322, 1324, respectively. The valves 1322, 1324 are controlled by signals received from the support circuits 611 of the system controller 605. One of the gas sources may include the initiator species. To assist in the CVD process, a resistive wire 1328 is placed in close proximity to the substrate S. Electrical current is supplied to the wire 1328 by a power supply 1326, based on signals received from the support circuits 611 of the system controller 605. The electrical current heats the wire 1328 to form the carbon nanotubes on the substrate S.

Figure 14:
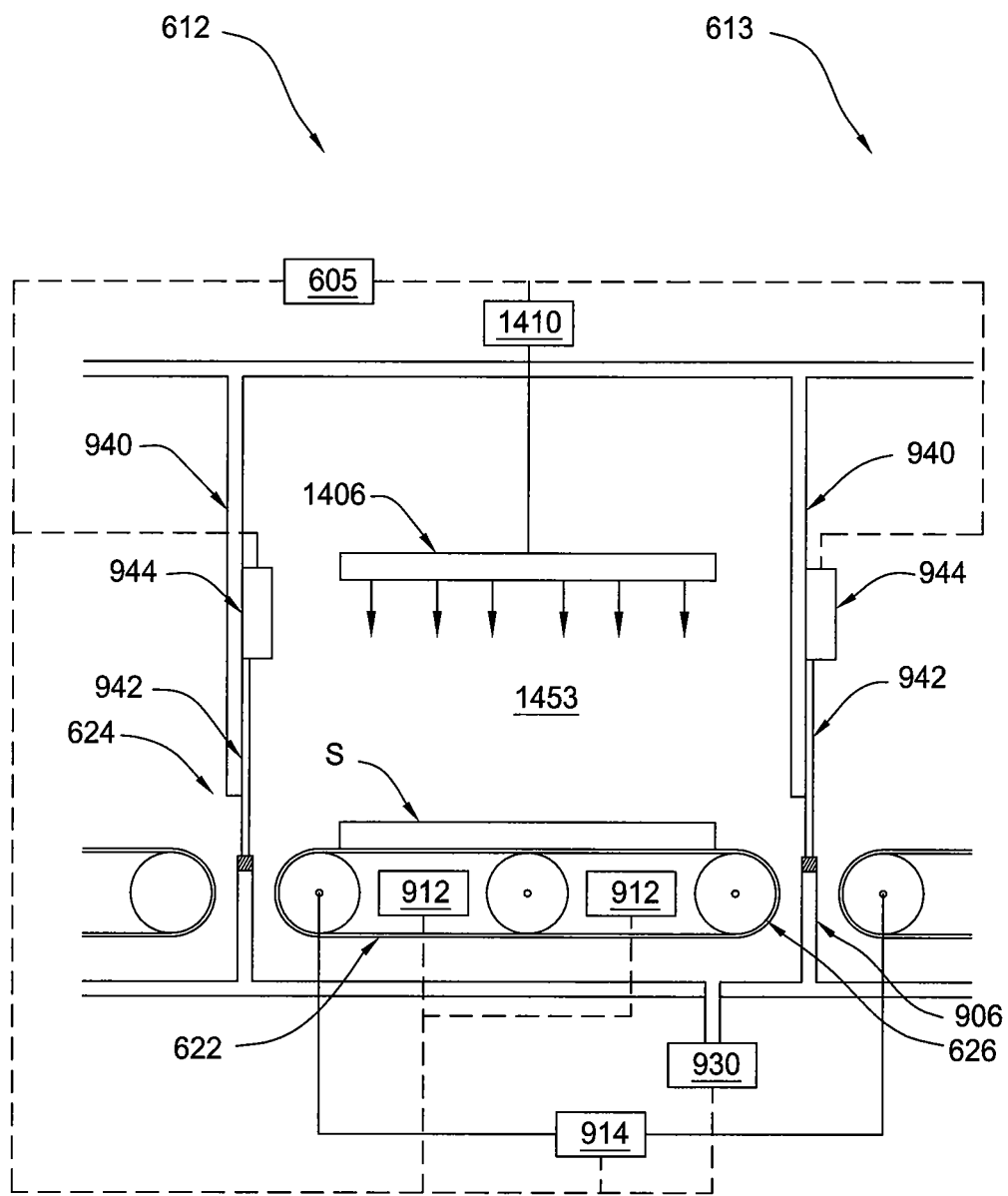
FIG. 14 is a schematic side view of one embodiment of a chamber 612 for depositing a current collector on substrates.

FIG. 14 is a schematic side view of one embodiment of a chamber 612 for depositing a current collector on substrates. In one embodiment, the chamber 612 of FIG. 14, is configured and adapted to deposit the current collector over the cathodic material in the processing region 1453 using a sputtering deposition process. A target 1406 of the catalyst material is provided in the chamber 612. A power source 1410 is connected to the target 1406 so that a cathodic DC and/or RF bias can be applied to the target 1406 so that the current collector can be deposited over the cathodic material. The plasma generated by the bias applied to the target 1406 causes atoms from the target surface to be removed, and be deposited on the exposed surfaces of the substrate S. In embodiments requiring heating of the substrates, one or more heating elements 912 may be provided. The heating elements 912 may comprise resistive heating elements, induction coils, or other heating means.

Figure 15:
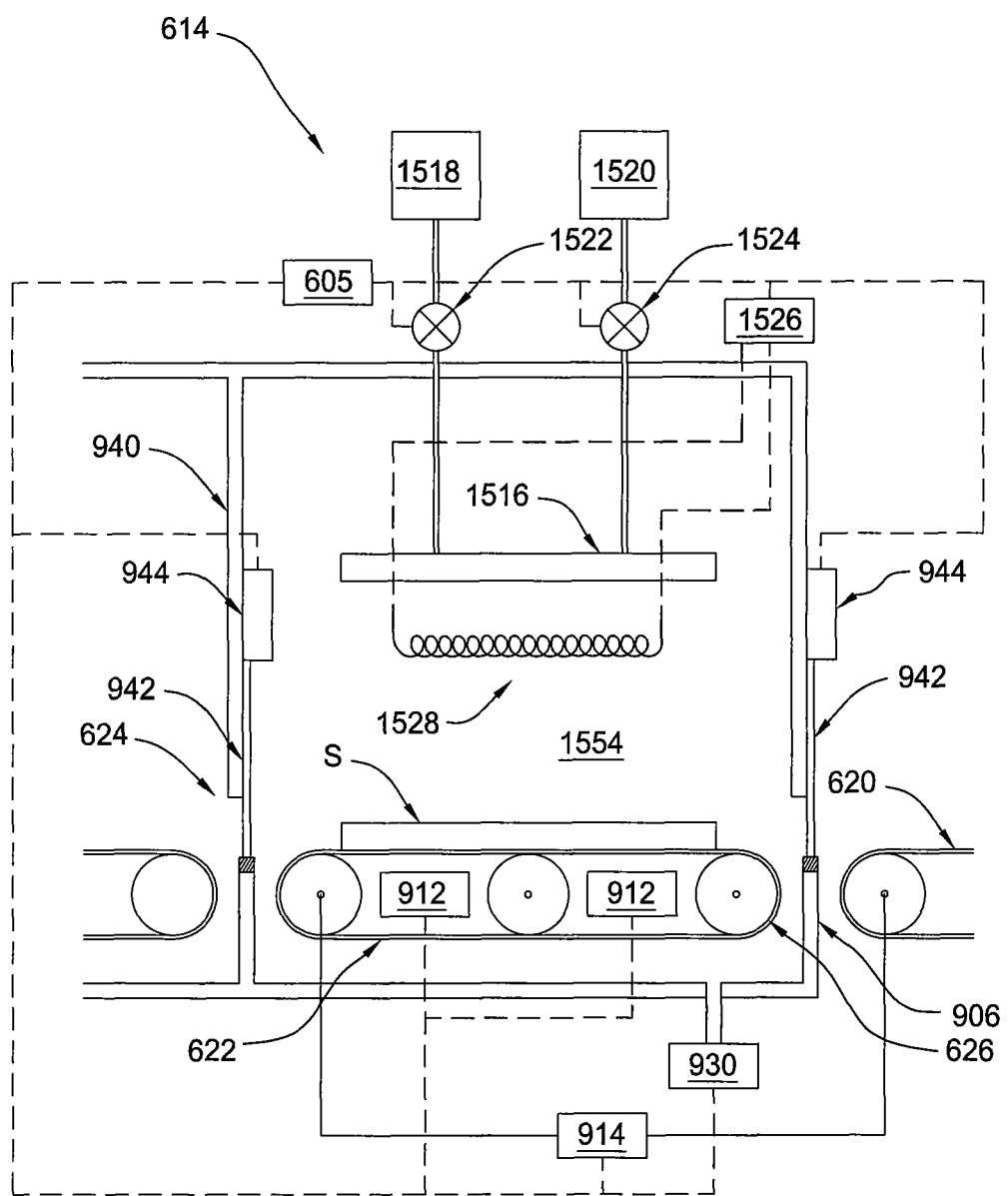
FIG. 15 is a schematic side view of one embodiment of a chamber 613 for depositing a packaging polymer on substrates.

FIG. 15 is a schematic side view of one embodiment of a chamber 613 for depositing a packaging polymer on substrates. Next, during block 414, as illustrated in FIG. 2F, a packaging polymer is deposited over the substrate. In one embodiment, chamber 613 of FIG. 15 is configured and adapted to deposit a packaging polymer over the substrate using an iCVD process. The iCVD process generally involves the vapor phase delivery of both initiator species and monomers into a processing region 1554 of the processing chamber 613 that is maintained in a vacuum state. In one embodiment, the electrolytic polymer is formed on the surface of the substrate by use of an iCVD process. In one embodiment, the chamber 613 is configured to deposit the electrolytic polymer using a low temperature iCVD process in which the temperature of the filament 1528 is maintained at a temperature between about 300° C. and 450° C., such as about 400° C. In the chamber 613, a showerhead 1516 receives process gasses from one or more gas sources 1518, 1520 via valves 1522, 1524, respectively. The valves 1522, 1524 are controlled by signals received from the support circuits 611 of the system controller 605. One of the gas sources may include the initiator species. To assist in the iCVD process, a resistive wire 1528 or filament is placed in close proximity to the substrate S. Electrical current is supplied to the wire 1528 by a power supply 1526, based on signals received from the support circuits 611 of the system controller 605. The electrical current heats the wire 1528 to form the packaging polymer on the substrate S.

While the foregoing is directed to embodiments of the present invention, other and further embodiments of the invention may be devised without departing from the basic scope thereof, and the scope thereof is determined by the claims that follow.

The invention claimed is:

1. A method of producing an energy storage device, comprising:
   positioning an anodic current collector into a processing region;
   depositing one or more three-dimensional electrodes separated by a finite distance on a surface of the anodic current collector such that portions of the surface of the anodic current collector remain exposed;
   selectively depositing an insulator layer on the exposed portions of the surface of the anodic current collector such that portions of the one or more three-dimensional electrodes remain exposed;
   depositing a conformal polymeric layer over the insulator layer and the exposed portions of the one or more three-dimensional electrodes using iCVD techniques comprising:
      flowing a gaseous monomer into the processing region;
      flowing a gaseous initiator into the processing region through a heated filament to form a reactive gas mixture of the gaseous monomer and the gaseous initiator, wherein the heated filament is heated to a temperature between about 300° C. and about 600° C., wherein the insulator layer prevents deposition of the conformal polymeric layer onto the surface of the anodic current collector;
   depositing a conformal layer of cathodic material over the conformal polymeric layer; and
   depositing a cathodic current collector over the conformal layer of cathodic material.

2. The method of claim 1, further comprising:
   depositing a non-reactive packaging polymer using iCVD techniques over the cathodic current collector to avoid the reactivity of the cathodic material with the atmosphere.

3. The method of claim 1, wherein the gaseous monomer is selected from a group consisting of: tetrafluoroethylene and organosiloxane.

4. The method of claim 3, wherein the initiator source is selected from the group consisting of: perfluorooctane sulfonyl fluoride (PFOS), perfluorobutane-1-sulfonyl fluoride (PFBS), triethylamine (TEA), tert-butyl peroxide (TBPO), 2,2'-azobis (2-methylpropane), tert-amyl peroxide (TAPO) and benzophenone.

5. The method of claim 1, wherein the anodic current collector is a copper foil and the cathodic current collector is an aluminum foil.

6. The method of claim 1, wherein the one or more three-dimensional electrodes comprise silicon nanowires or carbon nanotubes.

7. The method of claim 1, wherein depositing the insulator layer on the exposed portions of the surface of the anodic current collector comprises using masking techniques to surround the one or more three-dimensional electrodes prior to deposition of the conformal polymeric layer.

8. The method of claim 7, wherein the insulator layer is selected from the group of silicon oxide, aluminum nitride, and aluminum oxide.

9. The method of claim 1, wherein the conformal polymeric layer is an electrolytic polymer selected from the group consisting of: poly(tetrafluoroethylene) (PTFE), poly(glycidyl methacrylate) (p(GMA)), poly(dimethylaminomethylstyrene) (p(DMAMS), poly(perfluoroalkyl ethylmethacrylate), poly(trivinyltrimethoxy-cyclotrisiloxane), poly (furfuryl methacrylate), poly(cyclohexyl methacrylate-co-ethylene glycol dimethacrylate), poly(pentafluorophenyl methacrylate-co-ethylene glycol diacrylate), poly(2-hydroxyethyl methacrylate-co-ethylene glycol diacrylate), poly (methacrylic acid-co-ethylene glycol dimethacrylate), poly (3,4-ethylenedioxythiophene), silicone, and combinations thereof.

10. The method of claim 1, wherein the cathodic materials are selected from the group consisting of: $LiCoO_2$, $LiMnO_2$, $LiMn_2O_4$, $LiFePO_4$, $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, and $Li_2VOSiO_4$.

11. The method of claim 1, wherein the cathodic current collector is formed over the conformal layer of cathodic material using metal thin-film deposition processes.

* * * * *